US006780928B1

(12) United States Patent
Itoh et al.

(10) Patent No.: US 6,780,928 B1
(45) Date of Patent: Aug. 24, 2004

(54) POLYOXYALKYLENE MONOALKYL ETHER, PROCESS FOR PRODUCING THE SAME, POLYMERIZABLE POLYOXYALKYLENE MONOALKYL ETHER DERIVATIVE, POLYMER OF SAID DERIVATIVE AND DISPERSANT COMPRISING SAID POLYMER

(75) Inventors: Akinori Itoh, Kawasaki (JP); Susumu Honda, Tokyo (JP); Tatsuya Matsui, Kawasaki (JP); Yoshihiro Hayashi, Tokyo (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 10/645,508

(22) Filed: Aug. 22, 2003

Related U.S. Application Data

(62) Division of application No. 09/332,892, filed on Jun. 15, 1999, now Pat. No. 6,642,422.

(30) Foreign Application Priority Data

| Jun. 17, 1998 | (JP) | ............................................. | 10/170193 |
| Jun. 8, 1999 | (JP) | ............................................. | 11/160483 |
| Jun. 8, 1999 | (JP) | ............................................. | 11/160484 |

(51) Int. Cl.$^7$ .............................. C08J 3/02; C07C 43/15
(52) U.S. Cl. ..................... 524/599; 568/616; 568/617; 568/618; 528/271; 528/272; 528/306; 528/392; 525/437; 525/461
(58) Field of Search ............................... 568/616, 617, 568/618; 528/271, 272, 306, 392; 525/437, 461; 524/599

(56) References Cited

U.S. PATENT DOCUMENTS

| 3,293,193 A | 12/1966 | Krahler et al. |
| 4,721,816 A | 1/1988 | Edwards |
| 5,210,324 A | 5/1993 | Farrar et al. |

FOREIGN PATENT DOCUMENTS

| EP | 0 066 179 A1 | 5/1982 |

(List continued on next page.)

OTHER PUBLICATIONS

Derwent Publications Ltd., London, GB; AN 1998–20170; XP002175001 & JP 10 053738 A; Feb. 24, 1998.

(List continued on next page.)

Primary Examiner—Samuel A. Acquah
(74) Attorney, Agent, or Firm—Westerman, Hattori, Daniels & Adrian, LLP

(57) ABSTRACT

A polyoxyalkylene monoalkyl ether which gives, in gel permeation chromatography, a chromatogram which satisfies a relation expressed by an equation: $S_1/S_0 \leq 0.15$, wherein $S_1$ represents the area under a portion of the chromatogram from the start of elution to the earliest elution time when the intensity of the refractive index has a value of L/3, L representing the shortest distance between the greatest maximum point of the intensity of the refractive index and the base line and $S_0$ represents the area under a portion of the chromatogram from the start of elution to an elution time when the intensity of the refractive index has the greatest maximum value; a process for producing the above ether comprising adjusting the content of water in a reactor, which is used in addition polymerization of alkylene oxides with addition to a monohydric alcohol, so as to satisfy an equation: $Wi \times (Cf - Ci)/V \leq 10$, wherein the content of water in the reactor is obtained by placing a solvent having a content of water Ci (ppm) in an amount Wi (g) in the reactor having an inner volume V (ml), stirring the solvent to clean the reactor, removing the solvent from the reactor and obtaining a content of water Cf (ppm) in the removed solvent; a polymerizable derivative of the above ether; a polymer of this derivative, and a dispersant comprising this polymer.

A high purity polyoxyalkylene monoalkyl ether can be obtained and the dispersant comprising the polymer derived from this ether have an excellent dispersing property.

11 Claims, 11 Drawing Sheets

FOREIGN PATENT DOCUMENTS

| | | |
|---|---|---|
| EP | 0 331 308 A2 | 2/1989 |
| EP | 0 826 715 A1 | 8/1996 |
| EP | 0 985 697 A1 | 3/1999 |
| JP | 58-185622 | 10/1983 |
| JP | 10-53647 | 2/1998 |
| JP | 10-168177 | 6/1998 |

OTHER PUBLICATIONS

Derwent Publication Ltd., London, GB; AN 1982–10561J; XP002175002 & JP 57 185308 A; Nov. 15, 1982.

Oshima et al., "Current Status of Polyethylene Glycol and its Related Compounds"; (1987) 22(9), pp. 397–403. (See specification, p. 3).

POLYOXYALKYLENE MONOALKYL ETHER, PROCESS FOR PRODUCING THE SAME, POLYMERIZABLE POLYOXYALKYLENE MONOALKYL ETHER DERIVATIVE, POLYMER OF SAID DERIVATIVE AND DISPERSANT COMPRISING SAID POLYMER

This application is a divisional of prior application Ser. No. 09/332,892 filed Jun. 5, 1999 now U.S. Pat. No. 6,642,442.

BACKGROUND OF THE INVENTION

1. Field of the Invention

The present invention relates to a polyoxyalkylene monoalkyl ether, a process for producing the polyoxyalkylene monoalkyl ether, a polymerizable polyoxyalkylene monoalkyl ether derivative, a polymer of the derivative and a dispersant comprising the polymer. More particularly, the present invention relates to a high purity polyoxyalkylene monoalkyl ether which does not contain bifunctional alcohol compounds, a process for producing the polyoxyalkylene monoalkyl ether, a polymerizable polyoxyalkylene monoalkyl ether derivative prepared by using the polyoxyalkylene monoalkyl ether as a raw material, a polymer of the derivative, and a dispersant comprising the polymer and having an excellent dispersing property.

2. Description of the Related Arts

Polymerizable polyoxyalkylene monoalkyl ether derivatives have recently been developed and polymers and copolymers prepared from these derivatives used as monomers and other monomers have also been developed. However, the polymers and the copolymers prepared from such polyoxyalkylene monoalkyl ethers used as monomers occasionally do not exhibit the properties expected from the polymers and the copolymers because of a distribution of molecular weight broader than expected or formation of gel during polymerization. One of the reasons why these undesirable phenomena take place is considered to be the crosslinking reaction of bifunctional polyoxyalkylene glycol derivatives contained in the polymerizable polyoxyalkylene monoalkyl ether derivatives as byproducts.

To overcome the above problem, a polymerizable polyoxyalkylene monoalkyl ether derivative which does not contain any bifunctional polyoxyalkylene glycol derivatives as byproducts can be used as the monomer. A polymerizable polyoxyalkylene monoalkyl ether derivative may be obtained, for example, by using a compound which has a polymerizable functional group and to which an alkylene oxide can be added as a raw material. In this case, the polymerizable polyoxyalkylene monoalkyl ether derivative of the object compound can be obtained by adding an alkylene oxide to the above compound and reacting an alkyl compound with the formed terminal hydroxyl group. However, side reactions such as rearrangement of the polymerizable functional group and polymerization of the compound having a polymerizable function group tend to take place in the reaction condition for addition of the alkylene oxide to the compound having a polymerizable functional group. Side reactions such as polymerization and decomposition of ester portions tend to take place in the reaction condition for forming an alkyl ether. As the result, compounds different from the object compound are frequently obtained. Therefore, to obtain a polymerizable polyoxyalkylene monoalkyl ether derivative, it is generally conducted that a polymerizable functional group is incorporated into a polyoxyalkylene monoalkyl ether.

A bifunctional polymerizable polyoxyalkylene glycol derivative which is formed in the preparation of a polymerizable polyoxyalkylene monoalkyl ether derivative as a byproduct is derived from a polyoxyalkylene glycol contained as a byproduct in a polyoxyalkylene monoalkyl ether used as a raw material of the polymerizable polyoxyalkylene monoalkyl ether derivative. In other words, when the polymerizable functional group is incorporated into a polyoxyalkylene monoalkyl ether using, as the raw material, a polyoxyalkylene monoalkyl ether containing a polyoxyalkylene glycol as a byproduct, a polymerizable polyoxyalkylene glycol derivative having two polymerizable functional groups at the both end portions corresponding to the portions of the hydroxyl group in the polyoxyalkylene glycol is formed as a byproduct along with the monofunctional polymerizable polyoxyalkylene monoalkyl ether derivative of the object compound because the polymerizable functional group is incorporated into the portion of the hydroxyl group. Therefore, a polymerizable polyoxyalkylene monoalkyl ether derivative which does not contain any polymerizable polyoxyalkylene glycol derivatives having two polymerizable functional groups can be obtained when the used polyoxyalkylene monoalkyl ether does not contain any polyoxyalkylene glycols as byproducts.

A polyoxyalkylene monoalkyl ether is produced by direct addition of an alkylene oxide to a monohydric alcohol used as a raw material in the presence of an alkali catalyst or an acid catalyst. It is known that a plurality of byproducts are formed in this reaction depending on the condition of production (Yoshihiko Oshima and Toshiyasu Mizutani, Toso Kogaku (Coating Engineering), Volume 22, Pages 397 to 403, 1987). For example, when an alkylene oxide is added to a monohydric alcohol using a hydroxide of an alkali metal or an alkaline earth metal as the catalyst or when an alkylene oxide is added to a monohydric alcohol in the condition that water is present in a reactor, water and the alkylene oxide react to form a bifunctional glycol and further addition of the alkylene oxide to the formed bifunctional glycol takes place. As the result, polyoxyalkylene glycols which are dihydric alcohol compounds are formed as byproducts along with a polyoxyalkylene monoalkyl ether which is a monohydric alcohol compound. It is not easy to selectively separate a polyoxyalkylene monoalkyl ether from a mixture of the polyoxyalkylene monoalkyl ether and byproducts. The separation of the materials in large amounts is particularly difficult. Moreover, it is often difficult to determine the content of polyoxyalkylene glycols in a mixture with a polyoxyalkylene monoalkyl ether. Therefore, it is often difficult to decide whether an available polyoxyalkylene monoalkyl ether is suitable as the raw material for a polymerizable polyoxyalkylene monoalkyl ether derivative or not. Naturally, it is also difficult to determine the content of bifunctional polymerizable polyoxyalkylene glycol derivatives in a polymerizable polyoxyalkylene monoalkyl ether derivative obtained by using the above ether as the raw material.

SUMMARY OF THE INVENTION

An object of the present invention is to provide a high purity polyoxyalkylene monoalkyl ether which contains almost no dihydric alcohol compounds, a process for producing the polyoxyalkylene monoalkyl ether, a polymerizable polyoxyalkylene monoalkyl ether derivative prepared by using the polyoxyalkylene monoalkyl ether as a raw material, a polymer of the derivative and a dispersant comprising the polymer and having an excellent dispersing property.

To overcome the above problems, intensive studies were conducted by the present inventors with particular attention paid to the fact that a polyoxyalkylene glycol is a dihydric alcohol compound in contrast to a polyoxyalkylene monoalkyl ether which is a monohydric alcohol compound and that, when an alkylene oxide is added to a system in which these two compounds are present together, the number of molecules which can be added to the polyoxyalkylene glycol is theoretically twice the corresponding number added to the polyoxyalkylene monoalkyl ether. As the result, it was found that, when a polymerizable polyoxyalkylene monoalkyl ether derivative is obtained by using, as a raw material, a polyoxyalkylene monoalkyl ether which gave a chromatogram having a specific distribution in gel permeation chromatography and incorporating a polymerizable functional group into this polyoxyalkylene monoalkyl ether, the obtained polymerizable polyoxyalkylene monoalkyl ether derivative showed little trouble caused by a bifunctional polymerizable polyoxyalkylene glycol. The present invention has been completed on the basis of this knowledge.

Accordingly, the present invention provides:

(1) A polyoxyalkylene monoalkyl ether represented by formula [1]:

$$R^1O(AO)_nH \quad [1]$$

wherein $R^1$ represents a hydrocarbon group having 1 to 18 carbon atoms, AO represents an oxyalkylene group having 2 to 4 carbon atoms, n represents an average number of addition of the oxyalkylene group which is 5 to 500, a plurality of AO may represent the same type of oxyalkylene group or different types of oxyalkylene groups and, when the plurality of AO represent different types of oxyalkylene groups, the different types of oxyalkylene groups may be arranged randomly or in blocks, wherein a chromatogram of the polyoxyalkylene monoalkyl ether obtained in accordance with gel permeation chromatography which exhibits a relation between an intensity of a refractive index obtained by a differential refractometer and an elution time satisfies a relation expressed by equation (A):

$$S_1/S_0 \leq 0.15 \quad (A)$$

wherein $S_1$ represents an area under a portion of the chromatogram from start of elution to an earliest elution time when the intensity of a refractive index has a value of L/3, L representing a shortest distance between a greatest maximum point of the intensity of a refractive index and a base line, and $S_0$ represents an area under a portion of the chromatogram from start of elution to an elution time when the intensity of a refractive index has the greatest maximum value;

(2) A process for producing a polyoxyalkylene monoalkyl ether described in (1) comprising adjusting a content of water in a reactor, which is used in addition polymerization of alkylene oxides having 2 to 4 carbon atoms with addition to a monohydric alcohol, so as to satisfy equation (B):

$$\text{Content of water in the reactor} = Wi \times (Cf-Ci)/V \leq 10 \quad (B)$$

wherein the content of water in the reactor is obtained by placing a solvent having a content of water Ci (ppm) in an amount Wi (g) in the reactor having an inner volume V (ml), stirring the solvent in the reactor to clean the reactor, removing the solvent used for the cleaning from the reactor and obtaining a content of water Cf (ppm) in the removed solvent;

(3) A polymerizable polyoxyalkylene monoalkyl ether derivative prepared by using a polyoxyalkylene monoalkyl ether described in (1) as a raw material and represented by formula [2]:

$$R^1O(AO)_nR^2 \quad [2]$$

wherein $R^1$ represents a hydrocarbon group having 1 to 18 carbon atoms, $R^2$ represents an unsaturated hydrocarbon group having 2 to 4 carbon atoms, AO represents an oxyalkylene group having 2 to 4 carbon atoms, n represents an average number of addition of the oxyalkylene group which is 5 to 500, a plurality of AO may represent the same type of oxyalkylene group or different types of oxyalkylene groups and, when the plurality of AO represent different types of oxyalkylene groups, the different types of oxyalkylene groups may be arranged randomly or in blocks;

(4) A polymerizable polyoxyalkylene monoalkyl ether derivative prepared by using a polyoxyalkylene monoalkyl ether described in (1) as a raw material and represented by formula [3]:

$$R^1O(AO)_nR^3 \quad [3]$$

wherein $R^1$ represents a hydrocarbon group having 1 to 18 carbon atoms, $R^3$ represents acryloyl group or methacryloyl group, AO represents an oxyalkylene group having 2 to 4 carbon atoms, n represents an average number of addition of the oxyalkylene group which is 5 to 500, a plurality of AO may represent the same type of oxyalkylene group or different types of oxyalkylene groups and, when the plurality of AO represent different types of oxyalkylene groups, the different types of oxyalkylene groups may be arranged randomly or in blocks;

(5) A homopolymer which is obtained by polymerization of a polymerizable polyoxyalkylene monoalkyl ether derivative represented by formula [3] described in (4) and has a molecular weight of 1,000 to 300,000;

(6) A copolymer which is obtained by copolymerization of 5 to 95% by mol of a polymerizable polyoxyalkylene monoalkyl ether derivative represented by formula [2] described in (3) and 95 to 5% by mol of a monomer copolymerizable with the polymerizable polyoxyalkylene monoalkyl ether derivative and has a molecular weight of 500 to 100,000;

(7) A copolymer according to (6), wherein $R^2$ in formula [2] representing the polymerizable polyoxyalkylene monoalkyl ether derivative represents an unsaturated hydrocarbon group having 3 to 4 carbon atoms and the monomer copolymerizable with the polymerizable polyoxyalkylene monoalkyl ether derivative is an unsaturated carboxylic acid;

(8) A copolymer which is obtained by copolymerization of 5 to 95% by mol of a polymerizable polyoxyalkylene monoalkyl ether derivative represented by formula [3] described in (4) and 95 to 5% by mol of a monomer copolymerizable with the polymerizable polyoxyalkylene monoalkyl ether derivative and has a molecular weight of 500 to 100,000;

(9) A copolymer according to (8), wherein the monomer copolymerizable with the polymerizable polyoxyalkylene monoalkyl ether derivative represented by formula [3] is an unsaturated carboxylic acid; and

(10) A dispersant comprising a copolymer described in any of (6), (7), (8) and (9).

DESCRIPTION OF THE PREFERRED EMBODIMENTS

Figure 1:
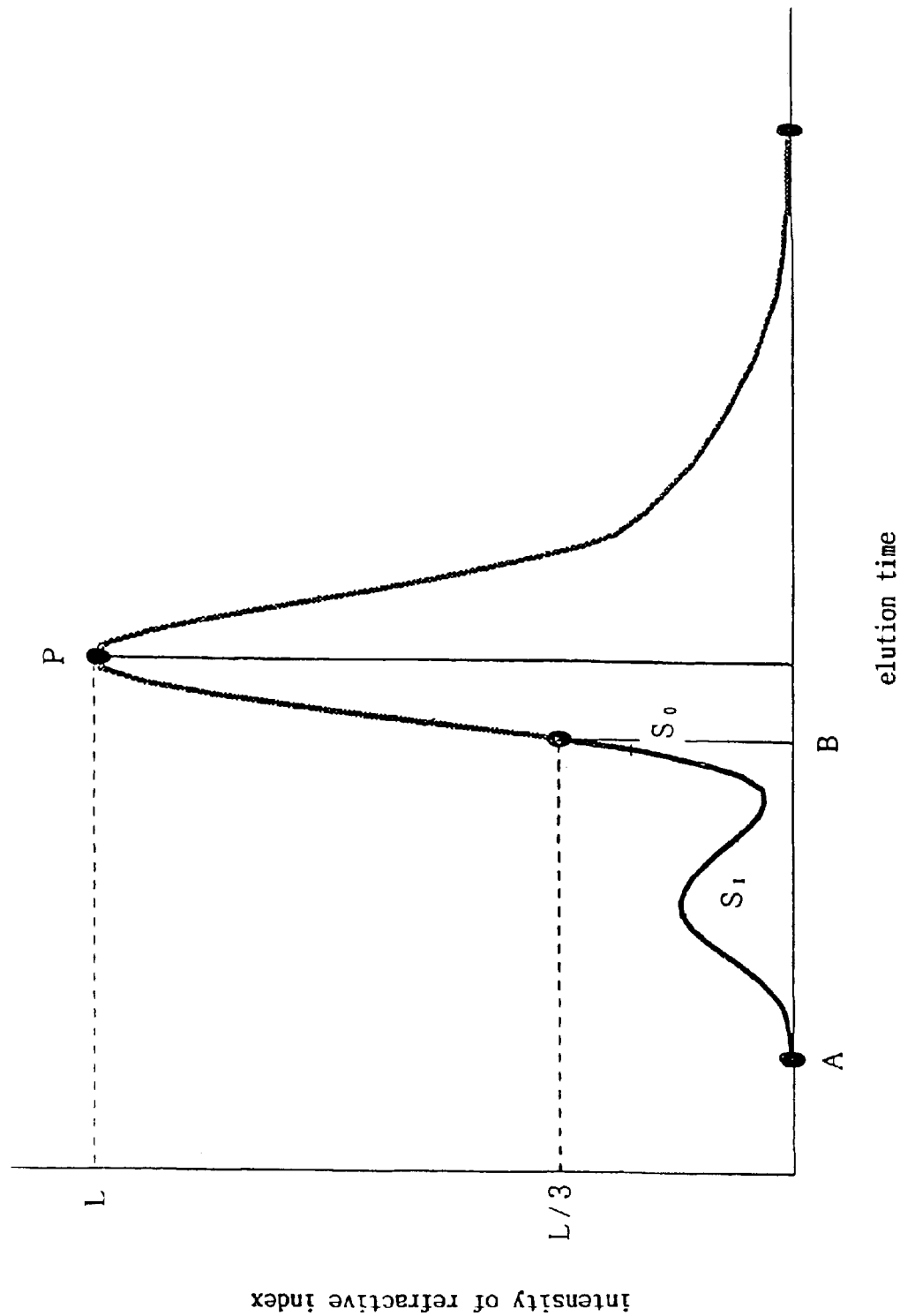
FIG. 1 shows a model chart of the chromatogram of a polyoxyalkylene monoalkyl ether obtained in accordance with gel permeation chromatography.

The polyoxyalkylene monoalkyl ether of the present invention is a compound represented by formula [1]:

$$R^1O(AO)_nH \quad [1]$$

In formula [1], $R^1$ represents a hydrocarbon group having 1 to 18 carbon atoms, AO represents an oxyalkylene group having 2 to 4 carbon atoms, n represents an average number of addition of the oxyalkylene group which is 5 to 500, a plurality of AO may represent the same type of oxyalkylene group or different types of oxyalkylene groups, and when the plurality of AO represent different types of oxyalkylene groups, the different types of oxyalkylene groups may be arranged randomly or in blocks.

Examples of the hydrocarbon group having 1 to 18 carbon atoms which is represented by $R^1$ in formula [1] include methyl group, ethyl group, propyl group, isopropyl group, butyl group, isobutyl group, sec-butyl group, tert-butyl group, pentyl group, isopentyl group, neopentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, cyclohexyl group, phenyl group and benzyl group. Among these groups, hydrocarbon groups having 1 to 4 carbon atoms are preferable.

Examples of the oxyalkylene group having 2 to 4 carbon atoms which is represented by AO in formula [1] include oxyethylene group, oxypropylene group, oxybutylene group and oxytetramethylene group. Among these groups, oxyethylene group, oxypropylene group and oxybutylene group are preferable. In formula [1], a plurality of AO may represent the same type of oxyalkylene group or different types of oxyalkylene groups and, when the plurality of AO represent different types of oxyalkylene groups, the different types of oxyalkylene groups may be arranged randomly or in blocks. n represents an average number of addition of the oxyalkylene group which is 5 to 500 and preferably 10 to 300. When the number represented by n is less than 5, there is the possibility that a dispersant obtained by using the polyoxyalkylene monoalkyl ether as a starting raw material does not exhibit sufficient dispersing property. When the number represented by n exceeds 500, there is the possibility that viscosity is excessively high to cause difficulty in handling.

The chromatogram of the polyoxyalkylene monoalkyl ether obtained in accordance with gel permeation chromatography which exhibits a relation between an intensity of a refractive index obtained by a differential refractometer and an elution time satisfies a relation expressed by equation (A):

$$S_1/S_0 \leq 0.15 \quad (A)$$

wherein $S_1$ represents the area under the portion of the chromatogram from the start of elution to the earliest elution time when the intensity of the refractive index has the value of L/3, L representing the shortest distance between the greatest maximum point of the intensity of the refractive index and the base line, and $S_0$ represents the area under the portion of the chromatogram from the start of elution to the elution time when the intensity of the refractive index has the greatest maximum value. In the computation of the above value, peaks derived from a developing solution and the like used in the gel permeation chromatography and pseudo-peaks due to fluctuation of the base line caused by the used column and apparatus are excluded and peaks derived from the polyoxyalkylene monoalkyl ether alone are taken into the computation.

FIG. 1 shows a model chart of the chromatogram of polyoxyalkylene monoalkyl ether obtained in accordance with gel permeation chromatography. The abscissa shows the elution time and the ordinate shows the intensity of the refractive index, i.e., the intensity showing the amount of the eluent on the basis of the refractive index, which is obtained by a differential refractometer. When a sample is injected into the gel permeation chromatograph and developed, elution begins at the point A with elution of molecules having the highest molecular weight and the elution curve goes upward as the intensity of the refractive index increases. Then, the elution curve passes through the maximum point of the intensity of the refractive index where the intensity of the refractive index becomes the maximum and declines. When considerable amounts of impurities are contained in fractions of higher molecular weights or in fractions of lower molecular weights, other maximum points of the intensity of the refractive index occasionally appear in addition to the above maximum point showing the greatest maximum intensity of the refractive index. The shortest distance between the greatest maximum point of the intensity of the refractive index and the base line is obtained and represented by L. Based on the obtained value of L, L/3 is calculated and the earliest elution time B when the intensity of the refractive index has a value of L/3 is obtained. The area under the portion of the elution curve from the start of the elution A to the time P when the intensity of the refractive index shows the greatest maximum value is represented by $S_0$ and the area under the portion of the elution curve from the start of the elution A to the earliest elution time B when the intensity of the refractive index becomes L/3 is represented by $S_1$. In the polyoxyalkylene monoalkyl ether of the present invention, the ratio of $S_1$ to $S_0$, i.e., $S_1/S_0$, is 0.15 or less and preferably 0.12 or less. When $S_1/S_0$ exceeds 0.15, the content of a polyoxyalkylene glycol in the polyoxyalkylene monoalkyl ether is great and there is the possibility that the dispersant obtained by using the polyoxyalkylene monoalkyl ether as the starting raw material does not exhibit a sufficient dispersing property.

As the value of $S_1/S_0$ increases, viscosities of a polyoxyalkylene monoalkyl ether, a polymerizable polyoxyalkylene monoalkyl ether derivative obtained by incorporating a polymerizable functional group into the ether and polymers obtained by polymerization of the derivative (a homopolymer and copolymers) increase due to bifunctional polymerizable polyoxyalkylene glycol derivatives. When the value of $S_1/S_0$ exceeds 0.15, there is the possibility that the dispersant obtained by using the polymer does not exhibit a sufficient dispersing property. When the value of $S_1/S_0$ is smaller, the increase in the viscosities due to bifunctional polymerizable polyoxyalkylene glycol derivatives takes place less markedly. When the value of $S_1/S_0$ is less than 0.15 and preferably less than 0.12, the dispersant obtained by using the polymer exhibits the proper excellent dispersing property.

In the present invention, the gel permeation chromatography used for obtaining the area $S_0$ and the area $S_1$ is not particularly limited. For example, SHODEX GPC SYSTEM-11 may be used as the GPC system, SHODEX RI-71 may be used as the differential refractometer and 3 columns of SHODEX KF804L may be connected in series and used as the column. The temperature of the column may be set at 40° C. and tetrahydrofuran may be used as the developing solvent. The developing solvent may be introduced at a rate of 1 ml/minute and 0.1 ml of a sample solution having a sample concentration of 0.1% by weight may be injected. A chromatogram showing the relation between the intensity of the refractive index and the elution time may be obtained using a BORWIN GPC computation program.

The polyoxyalkylene monoalkyl ether of the present invention can be easily produced when the content of water in a reactor, which is used in addition polymerization of alkylene oxides having 2 to 4 carbon atoms with addition to a monohydric alcohol, is adjusted so as to satisfy equation (B):

$$\text{Content of water in the reactor} = Wi \times (Cf - Ci)/V \leq 10 \quad (B)$$

wherein the content of water in the reactor is obtained by placing a solvent having a content of water Ci (ppm) in an amount Wi (g) in the reactor having an inner volume V (ml), stirring the solvent in the reactor to clean the reactor, removing the solvent used for the cleaning from the reactor and obtaining a content of water Cf (ppm) in the removed solvent. The content of water in the reactor is 10 or less as shown in the above equation and preferably 8 or less.

The content of water in the solvent is measured in advance in accordance with the Karl-Fischer method or the like and the solvent is placed into the reactor for the addition reaction of alkylene oxides. The solvent used is not particularly limited. Examples of the solvent include acetone and acetonitrile. The reactor is sealed and the inside of the reactor is cleaned with the solvent at the ordinary pressure or an added pressure at a temperature below or above the boiling point of the solvent, where necessary. After the cleaning is completed, the solvent in the reactor is carefully removed and the content of water in the removed solvent is measured in accordance with the Karl-Fischer method or the like. Using the inner volume of the reactor V (ml), the weight of the used solvent Wi (g), the content of water before the cleaning Ci (ppm) and the content of water after the cleaning Cf (ppm), the content of water in the reactor can be obtained in accordance with equation (B).

The polyoxyalkylene monoalkyl ether having the $S_1/S_0$ value of 0.15 or less of the present invention can be produced, for example, in accordance with the following process. Before the reaction, the inside of the reactor is cleaned with an aqueous solvent having a relatively low boiling point such as methanol, ethanol, isopropanol, acetone, methyl ethyl ketone and acetonitrile or a solvent forming an azeotrope with water such as benzene and toluene in advance and dried in the condition of 50 to 150° C. at 100 Torr or less to remove water in the reactor to the outside of the system. Then, a solvent is placed into the reactor and stirred to clean the reactor. The amount of the solvent used for the cleaning and the contents of water in the solvent before and after the cleaning are measured. The content of water in the reactor is obtained in accordance with equation (B) and it is confirmed that the content of water in the reactor is 10 or less.

It is preferable that a monohydric alcohol compound used as the starting raw material contains water in an amount as small as possible. When the monohydric alcohol used as the starting raw material can be distilled without forming an azeotrope with water, the alcohol is refluxed after addition of a drying agent such as sodium, potassium, sodium hydride and magnesium, distilled to remove water and added to the reactor in combination with an alkali catalyst excluding hydroxides of alkali metals and alkaline earth metals. When the alcohol used as the raw material and the alkali catalyst is placed into the reactor, it is necessary that a sufficient care be taken not to contaminate the reactor with water.

When the monohydric alcohol used as the raw material has a high boiling point and the distillation is difficult, water contained in the monohydric alcohol can be removed by placing a solvent forming an azeotrope with water such as toluene into the reactor in combination with the monohydric alcohol, treating the content at a reduced pressure in the condition of 50 to 150° C. at 200 Torr or less in an atmosphere of dry nitrogen gas for 1 hour or more and removing the used solvent. An alkali catalyst excluding hydroxides of alkali metals and alkaline earth metals is then added into the reactor with a sufficient care not to contaminate the reactor with water. After the pressure inside the reactor is raised with dry nitrogen gas, dry alkylene oxides are continuously added to the reactor at 50 to 150° C. to carry out the addition polymerization. It is preferable that the alkylene oxides having 2 to 4 carbon atoms which are starting raw materials and used for addition polymerization with addition to the monohydric alcohol contain water in an amount as small as possible. Naturally, it is important that a sufficient care be taken not to contaminate the reactor with water when the alkylene oxides having 2 to 4 carbon atoms are added to the reactor.

Examples of the alkali catalyst excluding hydroxides of alkali metals and alkaline earth metals which is used as the catalyst for the addition reaction of the alkylene oxide include sodium, potassium, sodium-potassium amalgam, sodium hydride, sodium methoxide, potassium methoxide, sodium ethoxide and potassium ethoxide. A methanol solution of sodium methoxide and an ethanol solution of sodium ethoxide can also be used.

Besides the above alkali catalyst, a Lewis acid catalyst such as boron trifluoride and tin tetrachloride may also be used in the addition reaction of the alkylene oxide. However, when a compound having a high molecular weight is prepared using an acid catalyst, there is the possibility that cyclic monomers such as 1,4-dioxane and cyclic polyethers are formed as byproducts and obtaining a compound having a desired purity becomes difficult.

The first embodiment of the polymerizable polyoxyalkylene monoalkyl ether derivative of the present invention is a compound represented by formula [2]:

$$R^1O(AO)_nR^2 \tag{2}$$

In formula [2], $R^1$ represents a hydrocarbon group having 1 to 18 carbon atoms, $R^2$ represents an unsaturated hydrocarbon group having 2 to 4 carbon atoms, n represents the average number of addition of the oxyalkylene group which is 5 to 500, a plurality of AO may represent the same type of oxyalkylene group or different types of oxyalkylene groups and, when the plurality of AO represent different types of oxyalkylene groups, the different types of oxyalkylene groups may be arranged randomly or in blocks.

Examples of the hydrocarbon group having 1 to 18 carbon atoms which is represented by $R^1$ in formula [2] include methyl group, ethyl group, propyl group, isopropyl group, butyl group, isobutyl group, sec-butyl group, tert-butyl group, pentyl group, isopentyl group, neopentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, cyclohexyl group, phenyl group and benzyl group. Among these groups, hydrocarbon groups having 1 to 4 carbon atoms are preferable.

Examples of the unsaturated hydrocarbon group having 2 to 4 carbon atoms which is represented by $R^2$ in formula [2] include vinyl group, allyl group, isopropenyl group, 1-propenyl group, methallyl group and 3-butenyl group. Among these groups, unsaturated hydrocarbon groups having 3 or 4 carbon atoms are preferable. Allyl group and methallyl group are more preferable due to easiness of incorporation into the compound represented by formula [1] and a suitable reactivity of polymerization.

Examples of the oxyalkylene group having 2 to 4 carbon atoms which is represented by AO in formula [2] include oxyethylene group, oxypropylene group, oxybutylene group and oxytetramethylene group. In formula [2], a plurality of AO may represent the same type of oxyalkylene group or different types of oxyalkylene groups and, when the plurality of AO represent different types of oxyalkylene groups, the different types of oxyalkylene groups may be arranged randomly or in blocks. n represents the average number of addition of the oxyalkylene group which is 5 to 500 and preferably 10 to 300. When the number represented by n is less than 5, there is the possibility that the dispersant obtained by using the polyoxyalkylene monoalkyl ether as a starting raw material does not exhibit sufficient dispersing property. When the number represented by n exceeds 500, there is the possibility that viscosity is excessively high to cause difficulty in handling.

The polymerizable polyoxyalkylene monoalkyl ether derivative represented by formula [2] of the present invention is produced using the polyoxyalkylene monoalkyl ether which is represented by formula [1] and satisfies the relation expressed by equation (A):

$$S_1/S_0 \leq 0.15 \tag{A}$$

in the chromatogram obtained by the measurement of the gel permeation chromatography. The method of incorporating the unsaturated hydrocarbon group represented by $R^2$ is not particularly limited. The unsaturated group can be incorporated into the compound represented by formula [2], for example, by adding an hydroxide of an alkali metal such as sodium hydroxide and potassium hydroxide to a polyoxyalkylene monoalkyl ether and then forming an ether by reaction with a monohalogenated unsaturated hydrocarbon such as allyl chloride, allyl bromide, allyl iodide, methallyl chloride and methallyl bromide.

The second embodiment of the polymerizable polyoxyalkylene monoalkyl ether derivative of the present invention is a compound represented by formula [3]:

$$R^1O(AO)_nR^3 \tag{3}$$

In formula [3], $R^1$ represents a hydrocarbon group having 1 to 18 carbon atoms, $R^3$ represents acryloyl group or methacryloyl group, n represents the average number of addition of the oxyalkylene group which is 5 to 500, a plurality of AO may represent the same type of oxyalkylene group or different types of oxyalkylene groups and, when the plurality of AO represent different types of oxyalkylene groups, the different types of oxyalkylene groups may be arranged randomly or in blocks.

Examples of the hydrocarbon group having 1 to 18 carbon atoms which is represented by $R^1$ in formula [3] include methyl group, ethyl group, propyl group, isopropyl group, butyl group, isobutyl group, sec-butyl group, tert-butyl group, pentyl group, isopentyl group, neopentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, cyclohexyl group, phenyl group and benzyl group. Among these groups, hydrocarbon groups having 1 to 4 carbon atoms are preferable.

Examples of the oxyalkylene group having 2 to 4 carbon atoms which is represented by AO in formula [3] include oxyethylene group, oxypropylene group, oxybutylene group and oxytetramethylene group. In formula [3], a plurality of AO may represent the same type of oxyalkylene group or different types of oxyalkylene groups and, when the plurality of AO represent different types of oxyalkylene groups, the different types of oxyalkylene groups may be arranged randomly or in blocks. n represents the average number of addition of the oxyalkylene group which is 5 to 500 and preferably 10 to 300. When the number represented by n is less than 5, there is the possibility that the dispersant obtained by using the polyoxyalkylene monoalkyl ether as a starting raw material does not exhibit sufficient dispersing property. When the number represented by n exceeds 500, there is the possibility that viscosity is excessively high to cause difficulty in handling.

The polymerizable polyoxyalkylene monoalkyl ether derivative represented by formula [3] of the present invention is produced using the polyoxyalkylene monoalkyl ether which is represented by formula [1] and satisfies the relation expressed by equation (A):

$$S_1/S_0 \leq 0.15 \tag{A}$$

in the chromatogram obtained by the measurement of the gel permeation chromatography. The method of incorporating acryloyl group or methacryloyl group represented by $R^3$ is not particularly limited. Acryloyl group or methacryloyl group can be incorporated, for example, by adding a catalyst such as p-toluenesulfonic acid monohydrate to a polyoxyalkylene monoalkyl ether and then conducting the esterification with acrylic acid or methacrylic acid; by adding a catalyst such as sodium methoxide to a polyoxyalkylene monoalkyl ether and then conducting transesterification with an alkyl acrylate such as methyl acrylate or an alkyl methacrylate such as methyl methacrylate; by reacting a polyoxyalkylene monoalkyl ether with acrylic chloride or methacrylic chloride; or by reacting a polyoxyalkylene monoalkyl ether with acrylic anhydride or methacrylic anhydride.

The polymer of the present invention is a copolymer of 5 to 95% by mol of the polymerizable polyoxyalkylene monoalkyl ether derivative represented by formula [2] and 95 to 5% by mol of a monomer copolymerizable with this derivative, a homopolymer of the polymerizable polyoxyalkylene monoalkyl ether derivative represented by formula [3], or a copolymer of 5 to 95% by mol of the polymerizable polyoxyalkylene monoalkyl ether derivative represented by formula [3] and 95 to 5% by mol of a monomer copolymerizable with this derivative. The homopolymer of the polymerizable polyoxyalkylene monoalkyl ether derivative represented by formula [3] has a molecular weight of 1,000 to 300,000 and preferably 5,000 to 100,000. The homopolymer may be a homopolymer of a single type of polymerizable polyoxyalkylene monoalkyl ether derivative or a mixture of homopolymers of two or more types of polymerizable polyoxyalkylene monoalkyl ether derivatives each represented by formula [3].

The copolymer of 5 to 95% by mol of the polymerizable polyoxyalkylene monoalkyl ether derivative represented by formula [2] and 95 to 5% by mol of a monomer copolymerizable with this derivative and the copolymer of 5 to 95% by mol of the polymerizable polyoxyalkylene monoalkyl ether derivative represented by formula [3] and 95 to 5% by mol of a monomer copolymerizable with this derivative each has a molecular weight of 500 to 100,000 and preferably 1,000 to 50,000. When the molecular weight of the copolymer is less than 500, there is the possibility that the dispersant comprising the copolymer does not exhibit a sufficient dispersing property. When the molecular weight of the copolymer exceeds 100,000, there is the possibility that viscosity is excessively high to cause difficult in handling.

It is more preferable that the copolymer of the polymerizable polyoxyalkylene monoalkyl ether derivative represented by formula [2] is a copolymer of a polymerizable polyoxyalkylene monoalkyl ether derivative represented by formula [2] in which $R^2$ represents an unsaturated hydrocarbon group having 3 or 4 carbon atoms. When $R^2$ represents an unsaturated hydrocarbon group having 3 or 4 carbon atoms, the derivative has a suitable degree of polymerization reactivity and the copolymer can be produced easily.

Examples of the copolymerizable monomer include unsaturated monocarboxylic acids such as acrylic acid, methacrylic acid and crotonic acid; salts of unsaturated monocarboxylic acids; unsaturated dicarboxylic acids such as maleic acid, fumaric acid, citraconic acid, mesaconic acid and itaconic acid; salts of unsaturated dicarboxylic acids; alkyl acrylates such as methyl acrylate, ethyl acrylate and butyl acrylate; alkyl methacrylates such as methyl methacrylate, ethyl methacrylate and butyl methacrylate; polymerizable aromatic unsaturated compounds such as styrene, p-styrenesulfonic acid and indene; olefins such as isobutylene and isoprene; maleimides such as N-phenylmaleimide and N-cyclohexylmaleimide; acrylamides; maleic anhydride; alkyl esters of maleic acid; vinyl acetate; acrylonitrile; allylsulfonic acid; methallylsulfonic acid; and salts of these compounds. A single type or a combination of two or more types of these monomers may be used. Among these monomers, unsaturated monocarboxylic acids, unsaturated dicarboxylic acids and salts of these carboxylic acids are preferably used. Acrylic acid, methacrylic acid, maleic acid and maleic anhydride are more preferably used.

In the present invention, the molecular weight of the homopolymer of the polymerizable polyoxyalkylene monoalkyl ether derivative represented by formula [3] and the copolymer of 5 to 95% by mol of the polymerizable polyoxyalkylene monoalkyl ether derivative represented by formula [2] or [3] and 95 to 5% by mol of a monomer copolymerizable with the derivative is measured in accordance with gel permeation chromatography (hereinafter referred to as GPC) and a weight-average molecular weight is obtained on the basis of the value of polyethylene glycol used as the reference.

The process for producing the polymer of the present invention is not particularly limited. The polymerizable polyoxyalkylene monoalkyl ether derivative represented by formula [3] alone or a combination of the polymerizable polyoxyalkylene monoalkyl ether derivative represented by formula [2] or [3] and a monomer copolymerizable with the derivative can be solution polymerized in an organic solvent or in an aqueous solvent or bulk polymerized without any solvent. Examples of a polymerization initiator used for the polymerization include polymerization initiators soluble in water such as hydroperoxides such as tert-butyl hydroperoxide and salts of persulfuric acid such as sodium persulfate, potassium persulfate and ammonium persulfate when an aqueous solvent is used. When the polymerization is conducted in an organic solvent or without any solvent, examples of the polymerization initiator used for the polymerization include peroxides such as benzoyl peroxide and di-tert-butyl peroxide and azo initiators such as 2,2'-azobisisobutyronitrile. A single type or a combination of two or more types of polymerization initiators may be used.

The dispersant of the present invention comprises the homopolymer of the polymerizable polyoxyalkylene monoalkyl ether derivative represented by formula [3] or a copolymer of 5 to 95% by mol of the polymerizable polyoxyalkylene monoalkyl ether derivative represented by formula [2] or [3] and 95 to 5% by mol of a monomer copolymerizable with the derivative. The homopolymer of the polymerizable polyoxyalkylene monoalkyl ether derivative represented by formula [3] and the copolymer of 5 to 95% by mol of the polymerizable polyoxyalkylene monoalkyl ether derivative represented by formula [2] or [3] and 95 to 5% by mol of a monomer copolymerizable with the derivative can exhibit an excellent dispersing property as a component of the dispersant. It is preferable that the copolymer comprised in the dispersant is a copolymer of 30 to 70% by mol of the polymerizable polyoxyalkylene monoalkyl ether derivative represented by formula [2] or [3] and 70 to 30% by mol of a monomer copolymerizable with the derivative.

The form of the dispersant of the present invention is not particularly limited. For example, the polymer may used by itself or the polymer may be used as an aqueous solution or a solution in an organic solvent. Agents such as deforming agents may further be added to the solution of the polymer. The used amount of the dispersant of the present invention is not particularly limited. Dispersion of solid particles and the effect to suppress precipitation in a solid-liquid dispersion system can be remarkably improved when the dispersant is added in an amount such that the amount of the polymer is 0.01 to 10% by weight and preferably 0.1 to 5% by weight of the solid material to be dispersed.

The dispersant of the present invention can be used in various applications. The dispersant is advantageously used, for example, as follows. When the dispersant is used in ceramic fields, slurries of inorganic materials are formed in high concentrations. When the dispersant is used in the field of coating materials, pigments are dispersed in vehicles as primary particles and stable suspensions are formed. When the dispersant is used in the field of cement, fluidity and maintenance of fluidity of mortar and concrete can be enhanced to improve strength, durability and applicability. The dispersant of the present invention is particularly advantageously used as the dispersant of inorganic powder materials and as the dispersant in the field of cement.

To summarize the advantages of the present invention, the polymerizable polyoxyalkylene monoalkyl ether derivative prepared by using the polyoxyalkylene monoalkyl ether having the specific molecular weight distribution of the present invention as the raw material contains bifunctional byproducts in a very small amount and the polymer prepared by using this derivative as the monomer causes little trouble due to crosslinking. Therefore, when the polymer is comprised in a dispersant for various powder materials such as inorganic pigments and organic pigments, an excellent effect can be exhibited with use in a small amount and thus the dispersant can be used effectively. When the dispersant is used as an additive to cement for buildings and constructions, an excellent fluidity can be exhibited with use in a small amount and workability and applicability can be improved.

EXAMPLES

The present invention will be described in more detail with reference to examples in the following.

Example 1

A 5 liter pressure-resistant reactor (inner volume: 4,890 ml) made of stainless steel and equipped with a thermometer, a pressure meter, a safety valve, an inlet tube for nitrogen gas, a stirrer, a vacuum suction tube, a cooling coil and a steam jacket was cleaned with water and purged with dry nitrogen gas to remove water inside the reactor. The reactor was then dried at a reduced pressure of 50 to 100 Torr for 15 minutes while steam was supplied to the steam jacket. After the step of cleaning with water was completed, the reactor was release to the ordinary pressure and cooled to the room temperature. Methanol in an amount of 2 liter was placed in the reactor and stirred at 0.05 to 0.1 MPa at 70 to 75° C. for 30 minutes in an atmosphere of nitrogen gas to clean the inside of the reactor with methanol. Methanol was removed and dry nitrogen gas was blown into the reactor. Steam was supplied to the steam jacket and the reactor was dried at a reduced pressure of 50 to 100 Torr for 1 hour.

After the reactor was cooled to the room temperature, 2,006 g of a commercially obtained dry acetonitrile (the content of water: 46 ppm as measured in accordance with the Karl Fischer method) was placed in the reactor via the inlet tube of nitrogen gas. The pressure inside the reactor was raised to 0.05 MPa with dry nitrogen gas and the content of the reactor was stirred for 15 minutes. Acetonitrile was then carefully taken out and 2,001 g of acetonitrile was recovered. The content of water in the recovered acetonitrile was obtained in accordance with the Karl Fischer method and found to be 60 ppm. The content of water inside the reactor obtained in accordance with equation (B) was 5.7.

The reactor was purged with dry nitrogen gas to remove acetonitrile remaining inside the reactor. Steam was supplied to the steam jacket and the reactor was dried at a reduced pressure of 50 to 100 Torr for 1 hour. After the reactor was cooled to 30° C. or lower, 27 g of dry methanol containing 18 ppm of water and 5 g of sodium methoxide were placed and the reactor was purged with nitrogen gas. After the temperature was raised to 90° C., 1,890 g of ethylene oxide was continuously supplied with a pressure via the inlet tube for nitrogen gas in the condition of 90 to 100° C. and 0.6 MPa or lower while the content of the reactor was stirred. After the addition of ethylene oxide was completed, the reaction was allowed to proceed at 90 to 100° C. for 2 hours. The reaction product was cooled to 80° C. and treated at a reduced pressure for 1 hour in the condition of 75 to 85° C. and 50 to 100 Torr while nitrogen gas was blown into the reactor. A portion of the reaction product in an amount of 200 g was taken out, neutralized with a 1N hydrochloric acid and then dried and filtered in an atmosphere of nitrogen gas. The obtained reaction product was subjected to the measurement in accordance with the gel permeation chromatography (GPC).

Figure 2:
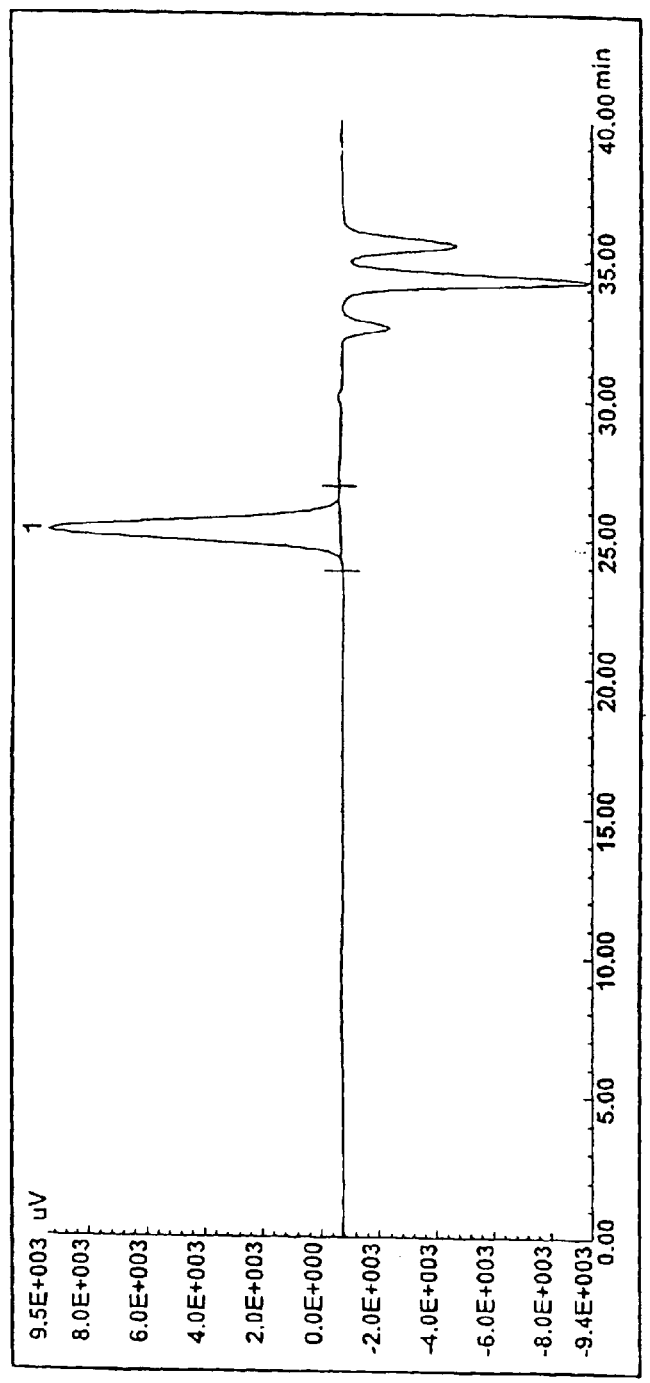
FIG. 2 shows a chromatogram of polyoxyethylene monomethyl ether obtained in Example 1 of the present invention.

In the measurement of GPC, SHODEX GPC SYSTEM-11 was used as the system, SHODEX RI-71 was used as the differential refractometer and 3 columns of SHODEX KF804L were connected in series and used as the column. The temperature of the column was set at 40° C. Tetrahydrofuran was used as the developing solvent and supplied at a rate of 1 ml/minute. Into the column, 0.1 ml of 0.1% by weight tetrahydrofuran solution of the obtained reaction product was injected. Using a BORWIN GPC computation program, a chromatogram showing the relation between the intensity of the refractive index and the elution time was obtained. FIG. 2 shows the obtained chromatogram. The value of $S_1/S_0$ was obtained from the chromatogram and found to be 0.137.

To the remaining portion of the reaction product, 54 g of potassium hydroxide was added. After the reactor was purged with nitrogen gas, the content of the reactor was treated at a reduced pressure for 1 hour in the condition of 80 to 90° C. and 50 to 100 Torr. The reactor was then cooled to 60° C. and 75 g of allyl chloride was added into the reactor with a pressure of nitrogen gas via the inlet tube of nitrogen gas. The reaction was allowed to proceed at 80 to 90° C at 0.2 to 0.3 MPa for 4 hours. The reaction product was neutralized with a 6N hydrochloric acid and dried at a reduced pressure. The formed salt was removed by filtration and polyoxyethylene monomethyl monoallyl ether (a) was obtained.

Example 2

Using the same type of pressure-resistant reactor as that used in Example 1, cleaning and drying were conducted in accordance with the same procedures as those conducted in Example 1. After the reactor was cooled to the room temperature, 1,750 g of a commercially obtained dry acetone (the content of water: 42 ppm as measured in accordance with the Karl Fischer method) was placed in the reactor via the inlet tube of nitrogen gas. The pressure inside the reactor was raised to 0.05 MPa with dry nitrogen gas and the content of the reactor was stirred for 15 minutes. Acetone was then carefully taken out and 1,744 g of acetone was recovered. The content of water in the recovered acetone was obtained in accordance with the Karl Fischer method and found to be 59 ppm. The content of water inside the reactor obtained in accordance with equation (B) was 6.1.

The reactor was purged with dry nitrogen gas to remove acetone remaining inside the reactor. Steam was supplied to the steam jacket and the reactor was dried at a reduced pressure of 50 to 100 Torr for 1 hour. After the reactor was cooled to the room temperature, 19 g of a methanol solution of sodium methoxide (a product of KAWAKEN FINE CHEMICAL Co., Ltd.; SM-28; sodium methoxide: 28% by weight) was placed and the reactor was purged with nitrogen gas. After the temperature was raised to 90° C., 2,845 g of ethylene oxide was continuously supplied with a pressure via the inlet tube for nitrogen gas in the condition of 90 to 100° C. and 0.6 MPa or lower while the content of the reactor was stirred. After the addition of ethylene oxide was completed, the reaction was allowed to proceed at 90 to 100° C. for 2 hours. The reaction product was cooled to 80° C and treated at a reduced pressure for 1 hour in the condition of 75 to 85° C. and 50 to 100 Torr while nitrogen gas was blown into the reactor.

Figure 3:
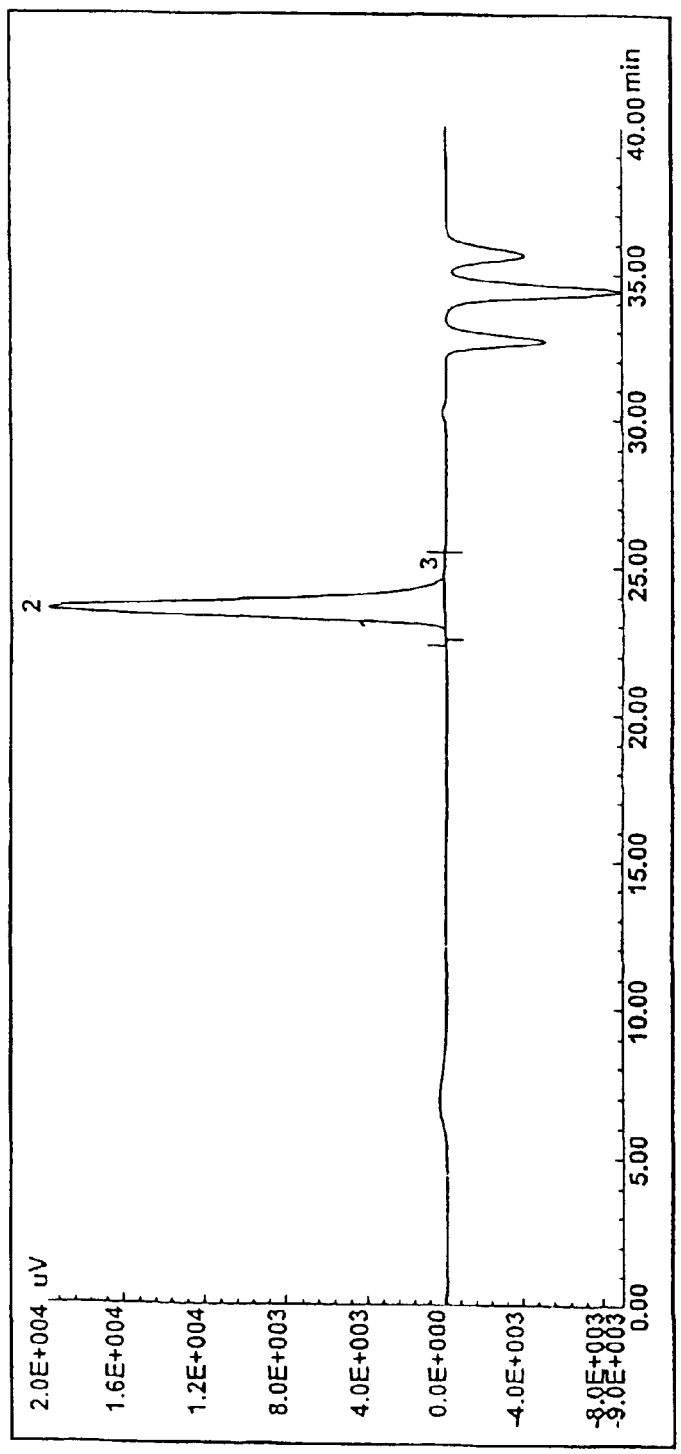
FIG. 3 shows a chromatogram of polyoxyethylene monomethyl ether obtained in Example 2 of the present invention.

A portion of the reaction product in an amount of 195 g was taken out, neutralized with a 1N hydrochloric acid and then dried and filtered in an atmosphere of nitrogen gas. The obtained reaction product was subjected to the measurement in accordance with GPC. FIG. 3 shows the obtained chromatogram. The value of $S_1/S_0$ was obtained from the chromatogram and found to be 0.112.

To the remaining portion of the reaction product, 34 g of potassium hydroxide was added. After the reactor was purged with nitrogen gas, the content of the reactor was treated at a reduced pressure for 1 hour in the condition of 80 to 90° C. and 50 to 100 Torr. The reactor was then cooled to 65° C. and 73 g of allyl bromide was added into the reactor with a pressure of nitrogen gas via the inlet tube of nitrogen gas. The reaction was allowed to proceed at 80 to 90° C. at 0.2 to 0.3 MPa for 4 hours. The reaction product was neutralized with a 6N hydrochloric acid and dried at a reduced pressure. The formed salt was removed by filtration and polyoxyethylene monomethyl monoallyl ether (b) was obtained.

Example 3

Using the same type of pressure-resistant reactor as that used in Example 1, cleaning and drying were conducted in accordance with the same procedures as those conducted in Example 1. After the reactor was cooled to the room temperature, 1,789 g of a commercially obtained dry acetone (the content of water: 42 ppm as measured in accordance with the Karl Fischer method) was placed in the reactor via the inlet tube of nitrogen gas. The pressure inside the reactor was raised to 0.05 MPa with dry nitrogen gas and the content of the reactor was stirred for 15 minutes. Acetone was then carefully taken out and 1,783 g of acetone was recovered. The content of water in the recovered acetone was obtained in accordance with the Karl Fischer method and found to be 61 ppm. The content of water inside the reactor obtained in accordance with equation (B) was 7.0.

The reactor was purged with dry nitrogen gas to remove acetone remaining inside the reactor. Steam was supplied to the steam jacket and the reactor was dried at a reduced pressure of 50 to 100 Torr for 1 hour: After the reactor was cooled to the room temperature, 550 g of stearyl alcohol was placed and the reactor was purged with nitrogen gas. After the temperature was raised to 110° C., the content of the reactor was dried at a reduced pressure of 100 Torr or lower while nitrogen gas was blown into the reactor. After the drying was completed, the temperature was reduced to 70° C. and a portion of the content in an amount of 17 g was taken out. The content of water in this portion was measured in accordance with the Karl Fischer method and found to be 37 ppm. Into the reactor, 1 g of sodium methoxide was added and the reactor was purged with nitrogen gas. After the temperature was raised to 80° C., 1,200 g of propylene oxide was continuously supplied with a pressure via the inlet tube for nitrogen gas in the condition of 90 to 100° C. and 0.6 MPa or lower while the content of the reactor was stirred. After the addition of propylene oxide was completed, the reaction was allowed to proceed at 90 to 100° C. for 2 hours. The reaction product was cooled to 80° C. and treated at a reduced pressure for 1 hour in the condition of 75 to 85° C. and 50 to 100 Torr while nitrogen gas was blown into the reactor.

A portion of the reaction product in an amount of 103 g was taken out, neutralized with a 1N hydrochloric acid and then dried and filtered in an atmosphere of nitrogen gas. The obtained reaction product was subjected to the measurement in accordance with GPC. The value of $S_1/S_0$ was obtained from the chromatogram and found to be 0.110.

To the remaining portion of the reaction product, 120 g of potassium hydroxide was added. After the reactor was purged with nitrogen gas, the content of the reactor was treated at a reduced pressure for 1 hour in the condition of 80 to 90° C. and 50 to 100 Torr. The reactor was then cooled to 60° C. and 168 g of allyl chloride was added into the reactor with a pressure of nitrogen gas via the inlet tube of nitrogen gas. The reaction was allowed to proceed at 80 to 90° C. at 0.2 to 0.3 MPa for 4 hours. The reaction product was neutralized with a 6N hydrochloric acid and dried at a reduced pressure. The formed salt was removed by filtration and polyoxypropylene monostearyl monoallyl ether (c) was obtained.

Example 4

Using the same type of pressure-resistant reactor as that used in Example 1, cleaning and drying were conducted in accordance with the same procedures as those conducted in Example 1. After the reactor was cooled to the room temperature, 1,912 g of a commercially obtained dry acetonitrile (the content of water: 46 ppm as measured in accordance with the Karl Fischer method) was placed in the reactor via the inlet tube of nitrogen gas. The pressure inside the reactor was raised to 0.05 MPa with dry nitrogen gas and the content of the reactor was stirred for 15 minutes. Acetonitrile was then carefully taken out and 1,907 g of acetonitrile was recovered. The content of water in the recovered acetonitrile was obtained in accordance with the Karl Fischer method and found to be 63 ppm. The content of water inside the reactor obtained in accordance with equation (B) was 6.6.

The reactor was purged with dry nitrogen gas to remove acetonitrile remaining inside the reactor. Steam was supplied to the steam jacket and the reactor was dried at a reduced pressure of 50 to 100 Torr for 1 hour. After the reactor was cooled to the room temperature, 72 g of n-butanol which had been distilled in advance and contained 19 ppm of water and 3 g of potassium tert-butoxide were placed and the reactor was purged with nitrogen gas. After the temperature was raised to 80° C., a mixture of 1,030 g of ethylene oxide and 1,370 g of propylene oxide was continuously supplied with a pressure via the inlet tube for nitrogen gas in the condition of 90 to 100° C. and 0.6 MPa or lower while the content of the reactor was stirred. After the addition of the mixture of ethylene oxide and propylene oxide was completed, the reaction was allowed to proceed at 90 to 100° C. for 2 hours. The reaction product was cooled to 80° C. and treated at a reduced pressure for 1 hour in the condition of 75 to 85° C. and 50 to 100 Torr while nitrogen gas was blown into the reactor.

A portion of the reaction product in an amount of 97 g was taken out, neutralized with a 1N hydrochloric acid and then dried and filtered in an atmosphere of nitrogen gas. The obtained reaction product was subjected to the measurement in accordance with GPC. The value of $S_1/S_0$ was obtained from the chromatogram and found to be 0.110.

To the remaining portion of the reaction product, 62 g of potassium hydroxide was added. After the reactor was purged with nitrogen gas, the content of the reactor was treated at a reduced pressure in the condition of 80 to 90° C. and 50 to 100 Torr. The reactor was then cooled to 60° C. and 85 g of allyl chloride was added into the reactor with a pressure of nitrogen gas via the inlet tube of nitrogen gas. The reaction was allowed to proceed at 80 to 90° C. at 0.2 to 0.3 MPa for 4 hours. The reaction product was neutralized with a 6N hydrochloric acid and dried at a reduced pressure. The formed salt was removed by filtration and polyoxyethyleneoxypropylene monobutyl monoallyl ether (d) was obtained.

Example 5

Using the same type of pressure-resistant reactor as that used in Example 1, cleaning and drying were conducted in accordance with the same procedures as those conducted in Example 1. After the reactor was cooled to the room temperature, 1,544 g of a commercially obtained dry acetonitrile (the content of water: 46 ppm as measured in accordance with the Karl Fischer method) was placed in the reactor via the inlet tube of nitrogen gas. The pressure inside the reactor was raised to 0.05 MPa with dry nitrogen gas and the content of the reactor was stirred for 15 minutes. Acetonitrile was then carefully taken out and 1,539 g of acetonitrile was recovered. The content of water in the recovered acetonitrile was obtained in accordance with the Karl Fischer method and found to be 66 ppm. The content of water inside the reactor obtained in accordance with equation (B) was 6.3.

The reactor was purged with dry nitrogen gas to remove acetonitrile remaining inside the reactor. Steam was supplied to the steam jacket and the reactor was dried at a reduced pressure of 50 to 100 Torr for 1 hour. After the reactor was cooled to the room temperature, 76 g of a methanol solution of sodium methoxide (a product of KAWAKEN FINE CHEMICAL Co., Ltd.; SM-28; sodium methoxide: 28% by weight) was placed and the reactor was purged with nitrogen gas. After the temperature was raised to 90° C., 1,860 g of 1,2-butylene oxide was continuously supplied with a pressure via the inlet tube for nitrogen gas in the condition of 90 to 100° C. and 0.6 MPa or lower while the content of the reactor was stirred. After the addition of 1,2-butylene oxide was completed, the reaction was allowed to proceed at 90 to 100° C. for 3 hours. The reaction product was cooled to 80° C. and treated at a reduced pressure for 1 hour in the condition of 75 to 85° C. and 50 to 100 Torr while nitrogen gas was blown into the reactor.

After the temperature was raised to 90° C., 530 g of ethylene oxide was continuously supplied with a pressure via the inlet tube for nitrogen gas in the condition of 90 to 100° C. and 0.6 MPa or lower while the content of the reactor was stirred. After the addition of ethylene oxide was completed, the reaction was allowed to proceed at 90 to 100° C. for 2 hours. The reaction product was cooled to 80° C. and treated at a reduced pressure for 1 hour in the condition of 75 to 85° C. and 50 to 100 Torr while nitrogen gas was blown into the reactor.

A portion of the reaction product in an amount of 112 g was taken out, neutralized with a 1N hydrochloric acid and then dried and filtered in an atmosphere of nitrogen gas. The obtained reaction product was subjected to the measurement in accordance with GPC. The value of $S_1/S_0$ was obtained from the chromatogram and found to be 0.081.

To the remaining portion of the reaction product, 134 g of potassium hydroxide was added. After the reactor was purged with nitrogen gas, the content of the reactor was treated at a reduced pressure for 1 hour in the condition of 80 to 90° C. and 50 to 100 Torr. The reactor was then cooled to 65° C. and 208 g of methallyl chloride was added into the reactor with a pressure of nitrogen gas via the inlet tube of nitrogen gas. The reaction was allowed to proceed at 80 to 90° C. at 0.2 to 0.3 MPa for 4 hours. The reaction product was neutralized with a 6N hydrochloric acid and dried at a reduced pressure. The formed salt was removed by filtration and polyoxybutyleneoxyethylene monomethyl monomethallyl ether (e) was obtained.

Example 6

Using the same type of pressure-resistant reactor as that used in Example 1, cleaning and drying were conducted in accordance with the same procedures as those conducted in Example 1. After the reactor was cooled to the room temperature, 1,982 g of a commercially obtained dry acetonitrile (the content of water: 46 ppm as measured in accordance with the Karl Fischer method) was placed in the reactor via the inlet tube of nitrogen gas. The pressure inside the reactor was raised to 0.05 MPa with dry nitrogen gas and the content of the reactor was stirred for 15 minutes. Acetonitrile was then carefully taken out and 1,974 g of acetonitrile was recovered. The content of water in the recovered acetonitrile was obtained in accordance with the Karl Fischer method and found to be 58 ppm. The content of water inside the reactor obtained in accordance with equation (B) was 4.9.

The reactor was purged with dry nitrogen gas to remove acetonitrile remaining inside the reactor. Steam was supplied to the steam jacket and the reactor was dried at a reduced pressure of 50 to 100 Torr for 1 hour. After the reactor was cooled to the room temperature, 61 g of a methanol solution of sodium methoxide (a product of KAWAKEN FINE CHEMICAL Co., Ltd.; SM-28; sodium methoxide: 28% by weight) was placed and the reactor was purged with nitrogen gas. After the temperature was raised to 90° C., 2,420 g of ethylene oxide was continuously supplied with a pressure via the inlet tube for nitrogen gas in the condition of 90 to 100° C. and 0.6 MPa or lower while the content of the reactor was stirred. After the addition of ethylene oxide was completed, the reaction was allowed to proceed at 90 to 100° C. for 3 hours. The reaction product was cooled to 80° C. and treated at a reduced pressure for 1 hour in the condition of 75 to 85° C. and 50 to 100 Torr while nitrogen gas was blown into the reactor.

A portion of the reaction product in an amount of 200 g was taken out, neutralized with a 1N hydrochloric acid and then dried and filtered in an atmosphere of nitrogen gas. The obtained reaction product was subjected to the measurement in accordance with GPC. The value of $S_1/S_0$ was obtained from the chromatogram and found to be 0.092.

To the remaining portion of the reaction product, 108 g of potassium hydroxide was added. After the reactor was purged with nitrogen gas, the content of the reactor was treated at a reduced pressure for 1 hour in the condition of 80 to 90° C. and 50 to 100 Torr. The reactor was then cooled to 65° C. and 135 g of allyl chloride was added into the reactor with a pressure of nitrogen gas via the inlet tube of nitrogen gas. The reaction was allowed to proceed at 80 to 90° C. at 0.2 to 0.3 MPa for 4 hours. The reaction product was neutralized with a 6N hydrochloric acid and dried at a reduced pressure. The formed salt was removed by filtration and polyoxyethylene monomethyl monoallyl ether (f) was obtained.

Comparative Example 1

The same type of pressure-resistant reactor as that used in Example 1 was cleaned with water and purged with dry nitrogen gas to remove water inside the reactor. The reactor was then dried at a reduced pressure of 50 to 100 Torr for 15 minutes while steam was supplied to the steam jacket. After the reactor was cooled to the room temperature, 1,992 g of the same dry acetonitrile as that used in Example 1, i.e., the commercially obtained acetonitrile containing 46 ppm of water, was placed in the reactor via the inlet tube of nitrogen gas. The pressure inside the reactor was raised to 0.05 MPa with dry nitrogen gas and the content of the reactor was stirred for 15 minutes. Acetonitrile was then carefully taken out and 1,986 g of acetonitrile was recovered. The content of water in the recovered acetonitrile was obtained in accordance with the Karl Fischer method and found to be 108 ppm. The content of water inside the reactor obtained in accordance with equation (B) was 25.3.

After the reactor was cooled to 30° C. or lower, 27 g of dried methanol and 5 g of sodium methoxide was placed and the reactor was purged with nitrogen gas. After the temperature was raised to 90° C., 1,890 g of ethylene oxide was continuously supplied with a pressure via the inlet tube for nitrogen gas in the condition of 90 to 100° C. and 0.6 MPa or lower while the content of the reactor was stirred. After the addition of ethylene oxide was completed, the reaction was allowed to proceed at 90 to 100° C. for 2 hours. The reaction product was cooled to 80° C. and treated at a reduced pressure for 1 hour in the condition of 75 to 85° C. and 50 to 100 Torr while nitrogen gas was blown into the reactor.

Figure 4:
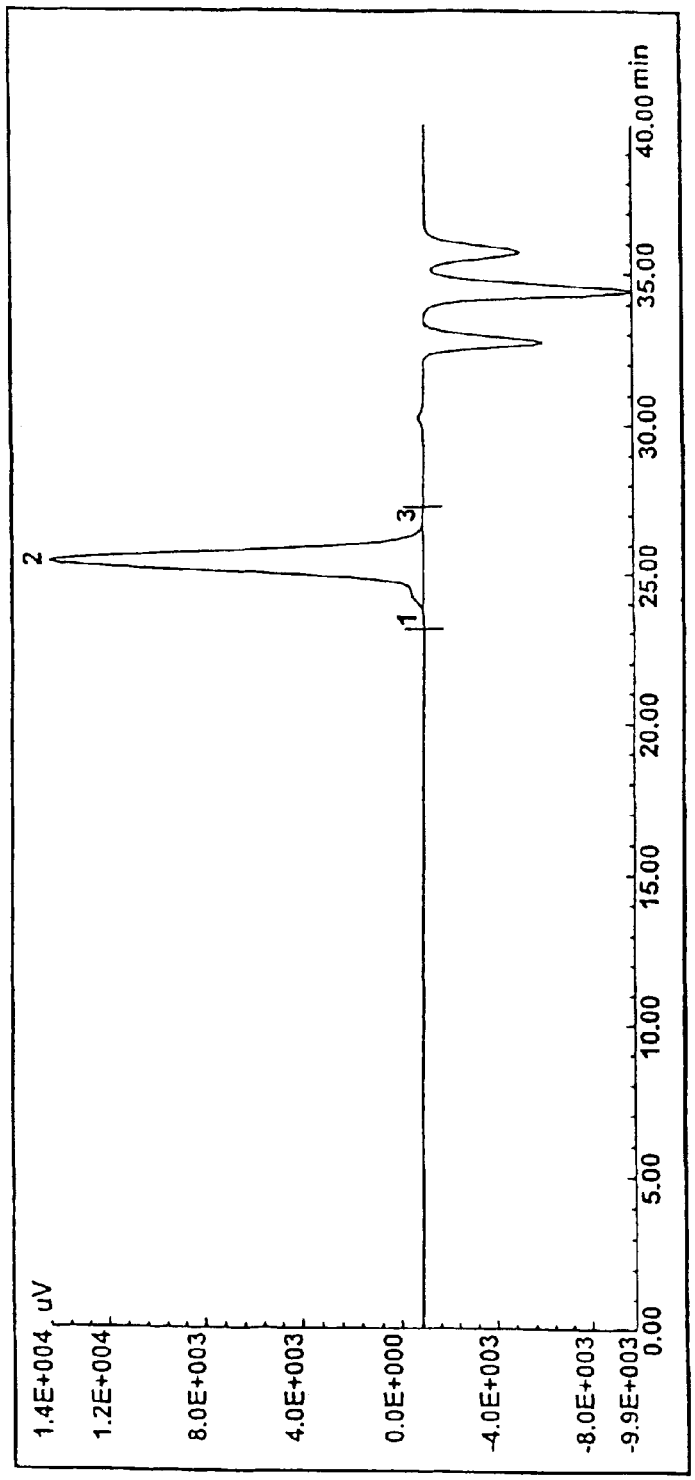
FIG. 4 shows a chromatogram of conventional polyoxyethylene monomethyl ether obtained in Comparative Example 1.

A portion of the reaction product in an amount of 200 g was taken out, neutralized with a 1N hydrochloric acid and then dried and filtered in an atmosphere of nitrogen gas. The obtained reaction product was subjected to the measurement in accordance with GPC. FIG. 4 shows the obtained chromatogram. The value of $S_1/S_0$ was obtained from the chromatogram and found to be 0.214.

To the remaining portion of the reaction product, 55 g of potassium hydroxide was added. After the reactor was purged with nitrogen gas, the content of the reactor was treated at a reduced pressure for 1 hour in the condition of 80 to 90° C. and 50 to 100 Torr. The reactor was then cooled to 65° C. and 77 g of allyl chloride was added into the reactor with a pressure of nitrogen gas via the inlet tube of nitrogen gas. The reaction was allowed to proceed at 80 to 90° C. at 0.2 to 0.3 MPa for 4 hours. The reaction product was neutralized with a 6N hydrochloric acid and dried at a reduced pressure. The formed salt was removed by filtration and polyoxyethylene monomethyl monoallyl ether (a') was obtained.

Comparative Example 2

Figure 5:
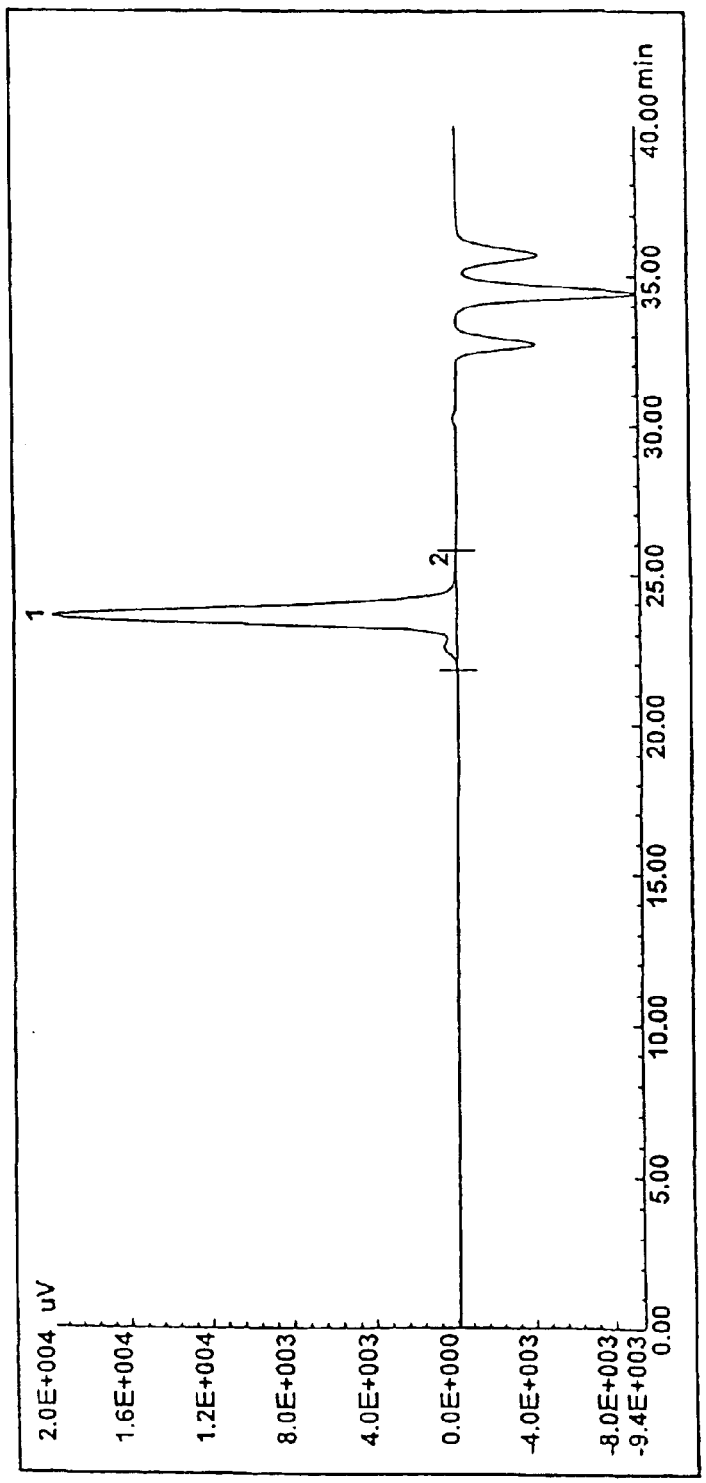
FIG. 5 shows a chromatogram of commercial polyoxyethylene monomethyl ether used in Comparative Example 2.

A commercially obtained polyoxyethylene monomethyl ether (a reagent manufactured by ALDRICH Company; poly(ethylene glycol) methyl ether; No. 20,251-7; weight-average molecular weight: 5,000) was subjected to the measurement in accordance with GPC. FIG. 5 shows the obtained chromatogram. The value of $S_1/S_0$ was obtained from the chromatogram and found to be 0.183.

Into a 1 liter pressure-resistant glass reactor, 200 g of the above polyethylene monomethyl ether was placed and 2.6 g of potassium hydroxide was added. After the reactor was purged with nitrogen gas, the content of the reactor was treated at a reduced pressure for 1 hour in the condition of 80 to 90° C. and 50 to 100 Torr. The reactor was then cooled to 60° C. and 5.6 g of allyl bromide was added into the reactor with a pressure of nitrogen gas via the inlet tube of nitrogen gas. The reaction was allowed to proceed at 80 to 90° C. at 0.2 to 0.3 MPa for 5 hours. The reaction product was neutralized with a 6N hydrochloric acid and dried at a reduced pressure. The formed salt was removed by filtration and polyoxyethylene monomethyl monoallyl ether (b') was obtained.

The values of L, $S_0$, $S_1$ and $S_1/S_0$ in the chromatograms obtained in Examples 1 to 6 and Comparative Examples 1 and 2 are shown in Table 1. The conditions of synthesis and the properties of the obtained compounds are shown in Table 2.

TABLE 1

| | L (elution time) | L/3 (elution time) | $S_0$ | $S_1$ | $S_1/S_0$ |
|---|---|---|---|---|---|
| Example 1 | 0.0107 (25.142) | 0.0036 (24.733) | 44.0974 | 6.0321 | 0.137 |
| Example 2 | 0.0129 (23.542) | 0.0043 (23.221) | 41.1708 | 4.6299 | 0.112 |
| Example 3 | 0.0138 (25.550) | 0.0046 (24.957) | 39.5182 | 4.3585 | 0.110 |
| Example 4 | 0.0168 (23.642) | 0.0056 (23.057) | 41.2735 | 4.5498 | 0.110 |
| Example 5 | 0.0111 (24.950) | 0.0037 (24.292) | 36.8409 | 2.9797 | 0.081 |
| Example 6 | 0.0123 (24.450) | 0.0041 (23.897) | 44.0926 | 4.0700 | 0.092 |
| Comparative Example 1 | 0.0100 (25.417) | 0.0033 (24.967) | 49.8518 | 10.6513 | 0.214 |
| Comparative Example 2 | 0.0127 (23.592) | 0.0042 (23.264) | 44.4713 | 8.1553 | 0.183 |

TABLE 2-1

| | Example 1 | Example 2 | Example 3 | Exampl 4 |
|---|---|---|---|---|
| $R^1$ | methyl | methyl | stearyl | n-butyl |
| AO | EO | EO | PO | EO/PO |
| Wi (g) | 2006 | 1750 | 1789 | 1912 |
| Ci (ppm) | 46 | 42 | 42 | 46 |
| Cf (ppm) | 60 | 59 | 61 | 63 |
| V (ml) | 4890 | 4890 | 4890 | 4890 |
| Content of water | 5.7 | 6.1 | 7.0 | 6.6 |
| Hydroxyl value (KOH mg/g) | 27.9 | 10.1 | 66.1 | 23.2 |
| Molecular weight | 2010 | 5550 | 850 | 2420 |
| n | 45 | 126 | 10 | 23/23 |
| $S_1/S_0$ | 0.137 | 0.112 | 0.110 | 0.110 |
| $R^2$ | allyl | allyl | allyl | allyl |
| Degree of unsaturation (meq/g) | 0.49 | 0.18 | 1.17 | 0.41 |

TABLE 2-2

| | Example 5 | Example 6 | Comparative Example 1 | Comparative Example 2 |
|---|---|---|---|---|
| $R^1$ | methyl | methyl | methyl | methyl |
| AO | BO-EO | EO | EO | EO |
| Wi (g) | 1544 | 1982 | 1992 | — |
| Ci (ppm) | 46 | 46 | 46 | — |
| Cf (ppm) | 66 | 58 | 108 | — |
| V (ml) | 4890 | 4890 | 4890 | — |
| Content of water | 6.3 | 4.9 | 25.3 | — |
| Hydroxyl value (KOH mg/g) | 48.4 | 36.7 | 27.9 | 10.2 |
| Molecular weight | 1160 | 1530 | 2010 | 5500 |

TABLE 2-2-continued

| | Example 5 | Example 6 | Comparative Example 1 | Comparative Example 2 |
|---|---|---|---|---|
| n | 12-6 | 34 | 45 | 124 |
| $S_1/S_0$ | 0.081 | 0.092 | 0.214 | 0.183 |
| $R^2$ | methallyl | allyl | allyl | allyl |
| Degree of unsaturation (meq/g) | 0.86 | 0.65 | 0.49 | 0.18 |

Notes:
EO: ethylene oxide
PO: propylene oxide
BO: 1,2-butylene oxide
EO/PO: random addition of EO and PO
BO-EO: block addition of BO and EO
Hydroxyl value: measured in accordance with the method of Japanese Industrial Standard K 1557 6.4
Degree of unsaturation: measured in accordance with the method of Japanese Industrial Standard K 1557 6.7
Molecular weight and n: calculated from the hydroxyl value assuming that the compound is a monoalkyl ether Example 7

Using the same type of pressure-resistant reactor as that used in Example 1, cleaning and drying were conducted in accordance with the same procedures as those conducted in Example 1. After the reactor was cooled to the room temperature, 2,010 g of a commercially obtained dry acetonitrile (the content of water: 51 ppm as measured in accordance with the Karl Fischer method) was placed in the reactor via the inlet tube of nitrogen gas. The pressure inside the reactor was raised to 0.05 MPa with dry nitrogen gas and the content of the reactor was stirred for 15 minutes. Acetonitrile was then carefully taken out and 2,002 g of acetonitrile was recovered. The content of water in the recovered acetonitrile was obtained in accordance with the Karl Fischer method and found to be 60 ppm. The content of water inside the reactor obtained in accordance with equation (B) was 6.2.

Figure 6:
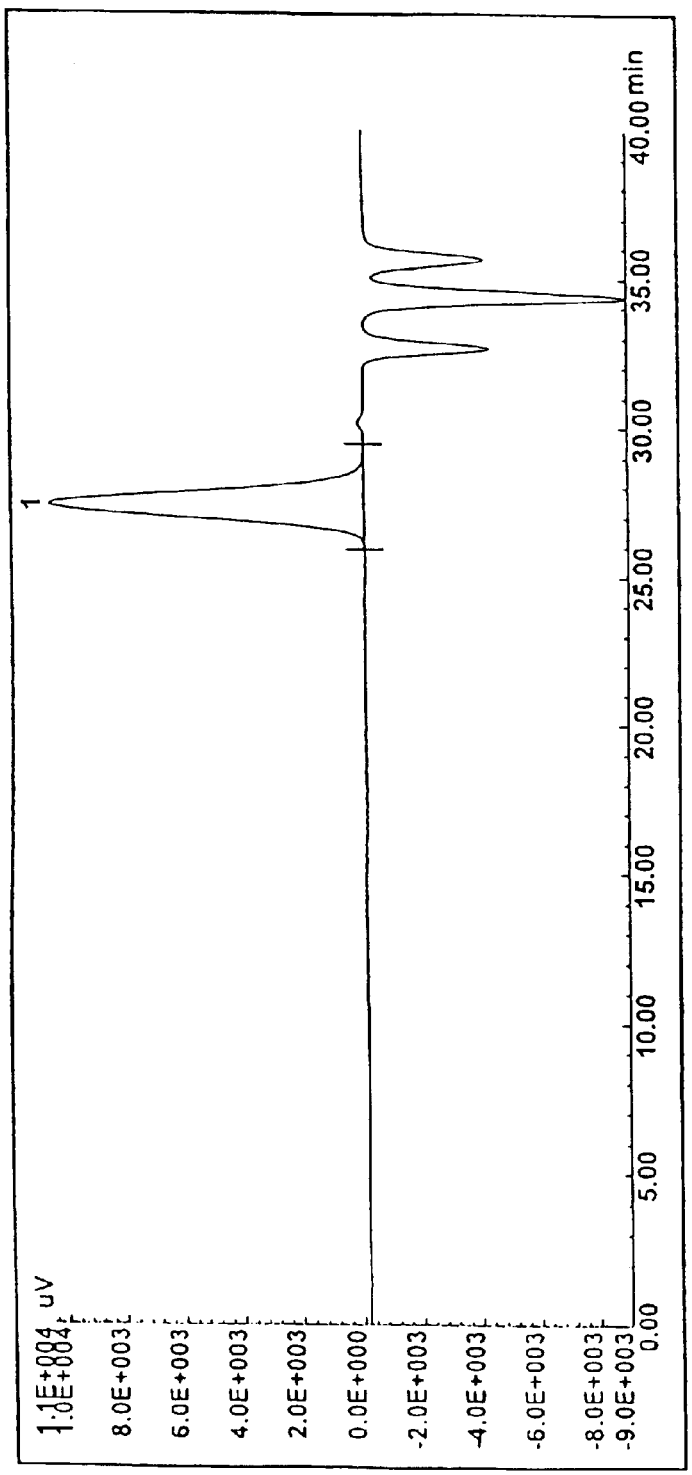
FIG. 6 shows a chromatogram of polyoxyethylene monomethyl ether obtained in Example 7 of the present invention.

The reactor was purged with dry nitrogen gas to remove acetonitrile remaining inside the reactor. Steam was supplied to the steam jacket and the reactor was dried at a reduced pressure of 50 to 100 Torr for 1 hour. After the reactor was cooled to the 30° C. or lower, 128 g of dry methanol containing 21 ppm of water and 27 g of sodium methoxide were placed and the reactor was purged with nitrogen gas. After the temperature was raised to 90° C., 3,640 g of ethylene oxide was continuously supplied with a pressure via the inlet tube for nitrogen gas in the condition of 90 to 100° C. and 0.6 MPa or lower while the content of the reactor was stirred. After the addition of ethylene oxide was completed, the reaction was allowed to proceed at 90 to 100° C. for 2 hours. The reaction product was cooled to 80° C. and treated at a reduced pressure for 1 hour in the condition of 75 to 85° C. and 50 to 100 Torr while nitrogen gas was blown into the reactor. The reaction product was transferred to a 5 liter eggplant type flask, quickly neutralized with a 1N hydrochloric acid and then dried and filtered in an atmosphere of nitrogen gas. The obtained reaction product was subjected to the measurement in accordance with GPC. FIG. 6 shows the obtained chromatogram. The value of $S_1/S_0$ was obtained from the chromatogram and found to be 0.114.

Into a 5 liter four-necked flask equipped with a stirrer, a thermometer, an inlet for the air, a Dean and Stark tube and a Dimroth condenser, 1,650 g of the reaction product was placed and, then, 1,400 g of toluene, 115 g of p-toluenesulfonic acid monohydrate and 5 g of hydroquinone were added. The temperature was raised to 50° C. and the mixture was stirred at 50 to 60° C. for 30 minutes. Methacrylic acid in an amount of 206 g was then added and the reaction was allowed to proceed at 110 to 120° C. for 9 hours while the air was blown into the mixture via the inlet for the air using an air pump. After the reaction product was cooled to 60° C. and transferred to a separating funnel, a 5N aqueous solution of sodium hydroxide was added and the mixture was shaken well. The mixture was then left standing and the formed lower layer was removed. To the remaining upper layer, a 20% by weight aqueous solution of sodium chloride was added and the mixture was shaken well. The mixture was then left standing and the formed lower layer was removed. To the remaining upper layer, 0.1 g of p-methoxyphenol was added. Toluene was removed at a reduced pressure at 60° C. or lower and polyoxyethylene monomethyl ether methacrylate (g) was obtained.

Example 8

Using the same type of pressure-resistant reactor as that used in Example 1, cleaning and drying were conducted in accordance with the same procedures as those conducted in Example 1. After the reactor was cooled to the room temperature, 2,100 g of a commercially obtained dry acetone (the content of water: 44 ppm as measured in accordance with the Karl Fischer method) was placed in the reactor via the inlet tube of nitrogen gas. The pressure inside the reactor was raised to 0.05 MPa with dry nitrogen gas and the content of the reactor was stirred for 15 minutes. Acetone was then carefully taken out and 2,095 g of acetone was recovered. The content of water in the recovered acetone was obtained in accordance with the Karl Fischer method and found to be 59 ppm. The content of water inside the reactor obtained in accordance with equation (B) was 6.4.

The reactor was purged with dry nitrogen gas to remove acetone remaining inside the reactor. Steam was supplied to the steam jacket and the reactor was dried at a reduced pressure of 50 to 100 Torr for 1 hour. After the reactor was cooled to the room temperature, 1,100 g of stearyl alcohol was placed and the reactor was purged with nitrogen gas. After the temperature was raised to 110° C., the content of the reactor was dried at 105 to 115° C. at a reduced pressure of 100 Torr or lower while nitrogen gas was blown into the reactor. After the drying was completed, the temperature was reduced to 70° C. and a portion of the content in an amount of 19 g was taken out. The content of water in the obtained material was measured in accordance with the Karl Fischer method and found to be 34 ppm. To the reactor, 2 g of sodium methoxide was added and the reactor was purged with nitrogen gas. After the temperature was raised to 80° C., 2,870 g of propylene oxide was continuously supplied with a pressure via the inlet tube for nitrogen gas in the condition of 90 to 100° C. and 0.6 MPa or lower while the content of the reactor was stirred. After the addition of propylene oxide was completed, the reaction was allowed to proceed at 90 to 100° C. for 2 hours.

Figure 7:
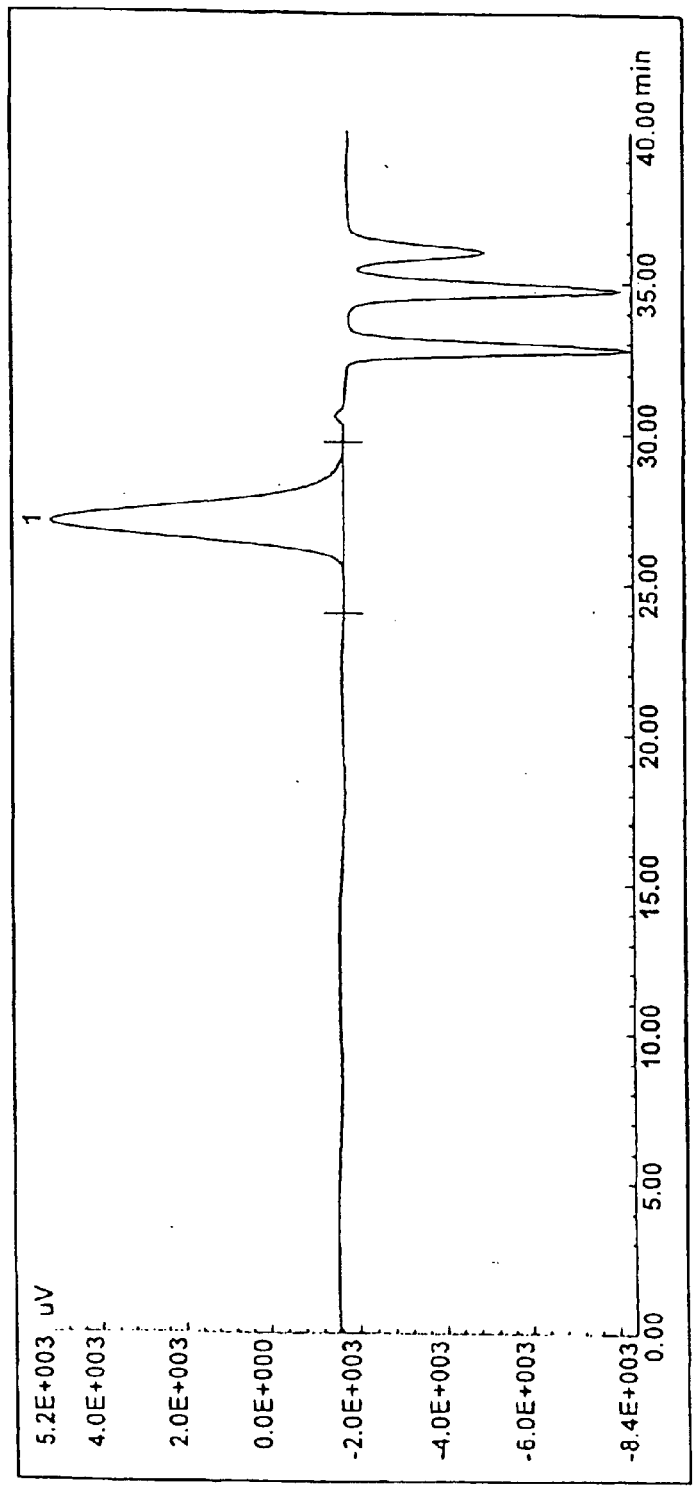
FIG. 7 shows a chromatogram of polyoxypropylene monostearyl ether obtained in Example 8 of the present invention.

The reaction product was cooled to 80° C. and treated at a reduced pressure for 1 hour in the condition of 75 to 85° C. and 50 to 100 Torr while nitrogen gas was blown into the reactor. A portion of the reaction product in an amount of 307 g was transferred to a 0.5 liter eggplant type flask, quickly neutralized with a 1N hydrochloric acid and then dried and filtered in an atmosphere of nitrogen gas. The obtained reaction product was subjected to the measurement in accordance with GPC. FIG. 7 shows the obtained chromatogram. The value of $S_1/S_0$ was obtained from the chromatogram and found to be 0.117.

Into a 3 liter four-necked flask equipped with a stirrer, a thermometer and an inlet for the air, 967 g of the remaining portion of the reaction product was placed. To this reaction product, 5 g of a methanol solution of sodium methoxide (a product of KAWAKEN FINE CHEMICAL Co., Ltd.; SM-28; sodium methoxide: 28% by weight) was added. After the temperature was raised to 110° C. in an atmosphere of nitrogen, methanol was removed at a reduced pressure of 100 Torr or lower at 105 to 110° C. while nitrogen gas was blown into the reactor.

After the temperature was reduced to 50° C., a Liebig condenser and a fractionating column were attached to the flask. Then, 1,032 g of methyl methacrylate and 0.6 g of t-butylhydroxytoluene were added and the reaction was allowed to proceed at 75 to 85° C. at 500 Torr for 4 hours while the air was blown into the reactor via the inlet for the air using an air pump. Methyl methacrylate was then recovered at a temperature of 95 to 105° C. at 50 Torr or lower. After being cooled to 60° C., the reaction product was transferred to a separating funnel. A 85% by weight aqueous solution of phosphoric acid and a 20% by weight aqueous solution of sodium chloride were added and the mixture was shaken well. The mixture was then left standing and the formed lower layer was removed. To the remaining upper layer, a 20% by weight aqueous solution of sodium chloride was added and the mixture was shaken well. After the mixture was left standing, the formed lower layer was removed and polyoxypropylene monostearyl ether methacrylate (h) was obtained.

Example 9

Using the same type of pressure-resistant reactor as that used in Example 1, cleaning and drying were conducted in accordance with the same procedures as those conducted in Example 1. After the reactor was cooled to the room temperature, 1,975 g of a commercially obtained dry acetonitrile (the content of water: 51 ppm as measured in accordance with the Karl Fischer method) was placed in the reactor via the inlet tube of nitrogen gas. The pressure inside the reactor was raised to 0.05 MPa with dry nitrogen gas and the content of the reactor was stirred for 15 minutes. Acetonitrile was then carefully taken out and 1,968 g of acetonitrile was recovered. The content of water in the recovered acetonitrile was obtained in accordance with the Karl Fischer method and found to be 65 ppm. The content of water inside the reactor obtained in accordance with equation (B) was 5.7.

The reactor was purged with dry nitrogen gas to remove acetonitrile remaining inside the reactor. Steam was supplied to the steam jacket and the reactor was dried at a reduced pressure of 50 to 100 Torr for 1 hour. After the reactor was cooled to the room temperature, 144 g of n-butanol which had been distilled in advance and contained 26 ppm of water and 6 g of potassium tert-butoxide were placed and the reactor was purged with nitrogen gas. After the temperature was raised to 80° C., 2,416 g of propylene oxide was continuously supplied with a pressure via the inlet tube for nitrogen gas in the condition of 90 to 100° C. and 0.6 MPa or lower while the content of the reactor was stirred. After the addition of propylene oxide was completed, the reaction was allowed to proceed at 90 to 100° C. for 2 hours. The reaction product was cooled to 80° C. and treated at a reduced pressure for 1 hour in the condition of 75 to 85° C. and 50 to 100 Torr while nitrogen gas was blown into the reactor. After the temperature was raised to 80° C., 588 g of 1,2-butylene oxide was continuously supplied with a pressure via the inlet tube for nitrogen gas in the condition of 90 to 100° C. and 0.6 MPa or lower while the content of the reactor was stirred. After the addition of 1,2-butylene oxide was completed, the reaction was allowed to proceed at 90 to 100° C. for 3 hours. The reaction product was cooled to 80° C. and treated at a reduced pressure for 1 hour in the condition of 75 to 85° C. and 50 to 100 Torr while nitrogen gas was blown into the reactor.

Figure 8:
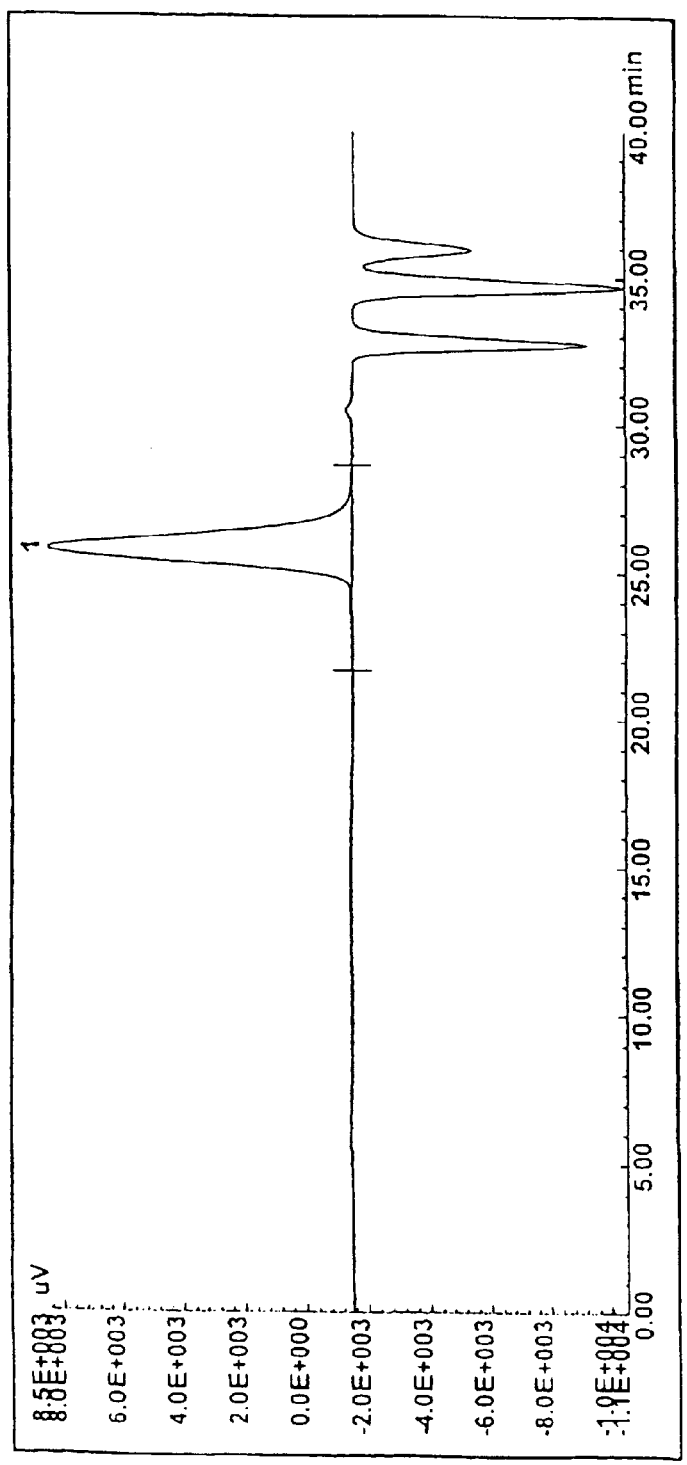
FIG. 8 shows a chromatogram of polyoxypropyleneoxybutylene monobutyl ether obtained in Example 9 of the present invention.

The reaction product was transferred to a 5 liter eggplant type flask, quickly neutralized with a 1N hydrochloric acid and then dried and filtered in an atmosphere of nitrogen gas. The obtained reaction product was subjected to the measurement in accordance with GPC. FIG. 8 shows the obtained chromatogram. The value of $S_1/S_0$ was obtained from the chromatogram and found to be 0.103.

Into a 5 liter four-necked flask equipped with a stirrer, a thermometer, an inlet for the air, a Dean and Stark tube and a Dimroth condenser, 1,456 g of the reaction product was placed and then 1,200 g of toluene, 46 g of p-toluenesulfonic acid monohydrate and 6 g of hydroquinone were added. The temperature was raised to 50° C. and the mixture was stirred at 50 to 60° C. for 30 minutes. Methacrylic acid in an amount of 89 g was then added and the reaction was allowed to proceed at 110 to 120° C. for 12 hours while the air was blown into the mixture via the inlet for the air using an air pump. After the reaction product was cooled to 60° C. and transferred to a separating funnel, a 5N aqueous solution of sodium hydroxide was added and the mixture was shaken well. The mixture was then left standing and the formed lower layer was removed To the remaining upper layer, a 20% by weight aqueous solution of sodium chloride was added and the mixture was shaken well. The mixture was then left standing and the formed lower layer was removed. To the remaining upper layer, 0.1 g of p-methoxyphenol was added. Toluene was removed at a reduced pressure at 60° C. or lower and polyoxypropyleneoxybutylene monobutyl ether methacrylate (i) was obtained.

Example 10

Using the same type of pressure-resistant reactor as that used in Example 1, cleaning and drying were conducted in accordance with the same procedures as those conducted in Example 1. After the reactor was cooled to the room temperature, 1,857 g of a commercially obtained dry acetonitrile (the content of water: 51 ppm as measured in accordance with the Karl Fischer method) was placed in the reactor via the inlet tube of nitrogen gas. The pressure inside the reactor was raised to 0.05 MPa with dry nitrogen gas and the content of the reactor was stirred for 15 minutes. Acetonitrile was then carefully taken out and 1,848 g of acetonitrile was recovered. The content of water in the recovered acetonitrile was obtained in accordance with the Karl Fischer method and found to be 68 ppm. The content of water inside the reactor obtained in accordance with equation (B) was 6.5.

The reactor was purged with dry nitrogen gas to remove acetonitrile remaining inside the reactor. Steam was supplied to the steam jacket and the reactor was dried at a reduced pressure of 50 to 100 Torr for 1 hour. After the reactor was cooled to the room temperature, 76 g of a methanol solution of sodium methoxide (a product of KAWAKEN FINE CHEMICAL Co., Ltd.; SM-28; sodium methoxide: 28% by weight) was placed and the reactor was purged with nitrogen gas. After the temperature was raised to 90° C., a mixture of 2,904 g of ethylene oxide and 1,196 g of propylene oxide was continuously supplied with a pressure via the inlet tube for nitrogen gas in the condition of 90 to 100° C. and 0.6

MPa or lower while the content of the reactor was stirred. After the addition of the mixture of ethylene oxide and propylene oxide was completed, the reaction was allowed to proceed at 90 to 100° C. for 3 hours. The reaction product was cooled to 80° C. and treated at a reduced pressure for 1 hour in the condition of 75 to 85° C. and 50 to 100 Torr while nitrogen gas was blown into the reactor.

Figure 9:
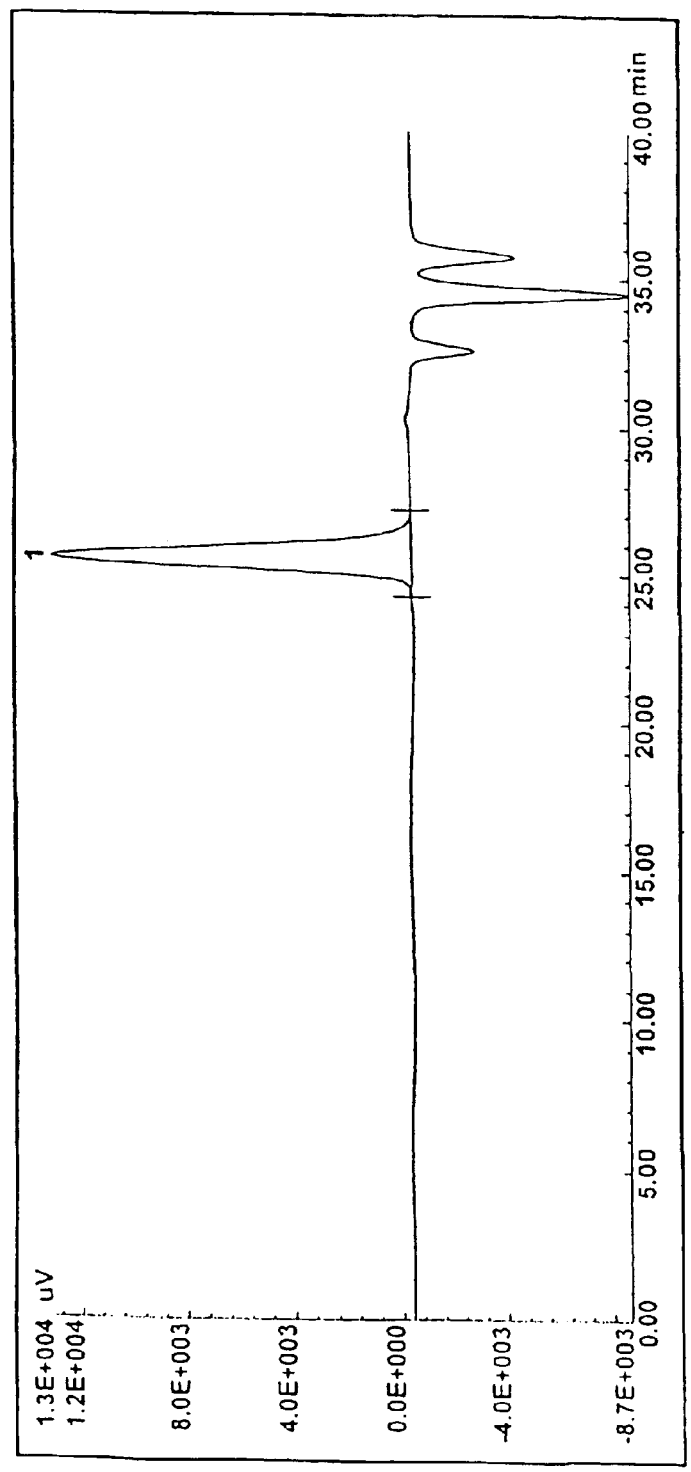
FIG. 9 shows a chromatogram of polyoxyethyleneoxypropylene monomethyl ether obtained in Example 10 of the present invention.

The reaction product was transferred to a 5 liter eggplant type flask, quickly neutralized with a 1N hydrochloric acid and then dried and filtered in an atmosphere of nitrogen gas. The obtained reaction product was subjected to the measurement in accordance with GPC. FIG. 9 shows the obtained chromatogram. The value of $S_1/S_0$ was obtained from the chromatogram and found to be 0.124.

Into a 5 liter four-necked flask equipped with a stirrer, a thermometer, an inlet for the air, a Dean and Stark tube and a Dimroth condenser, 1,415 g of the reaction product was placed and then 1,500 g of n-hexane, 53 g of p-toluenesulfonic acid monohydrate and 6 g of hydroquinone were added. The temperature was raised to 40° C. and the mixture was stirred at 40 to 50° C. for 30 minutes. Acrylic acid in an amount of 66 g was then added and the reaction was allowed to proceed at 70 to 75° C. for 12 hours while the air was blown into the mixture via the inlet for the air using an air pump. After the reaction product was cooled to 50° C. and transferred to a separating funnel, a 5N aqueous solution of sodium hydroxide was added and the mixture was shaken well. The mixture was then left standing and the formed lower layer was removed. To the remaining upper layer, a 20% by weight aqueous solution of sodium chloride was added and the mixture was shaken well. The mixture was then left standing and the formed lower layer was removed. To the remaining upper layer, 0.1 g of p-methoxyphenol was added. Toluene was removed at a reduced pressure at 60° C. or lower and polyoxyethyleneoxypropylene monomethyl ether acrylate (j) was obtained.

Example 11

Using the same type of pressure-resistant reactor as that used in Example 1, cleaning and drying were conducted in accordance with the same procedures as those conducted in Example 1. After the reactor was cooled to the room temperature, 2,206 g of a commercially obtained dry acetone (the content of water: 44 ppm as measured in accordance with the Karl Fischer method) was placed in the reactor via the inlet tube of nitrogen gas. The pressure inside the reactor was raised to 0.05 MPa with dry nitrogen gas and the content of the reactor was stirred for 15 minutes. Acetone was then carefully taken out and 2,197 g of acetone was recovered. The content of water in the recovered acetone was obtained in accordance with the Karl Fischer method and found to be 63 ppm. The content of water inside the reactor obtained in accordance with equation (B) was 8.6.

The reactor was purged with dry nitrogen gas to remove acetone remaining inside the reactor Steam was supplied to the steam jacket and the reactor was dried at a reduced pressure of 50 to 100 Torr for 1 hour. After the reactor was cooled to the room temperature, 46 g of a methanol solution of sodium methoxide (a product of KAWAKEN FINE CHEMICAL Co., Ltd.; SM-28; sodium methoxide: 28% by weight) was placed and the reactor was purged with nitrogen gas. After the temperature was raised to 90° C., 3,683 g of ethylene oxide was continuously supplied with a pressure via the inlet tube for nitrogen gas in the condition of 90 to 100° C. and 0.6 MPa or lower while the content of the reactor was stirred. After the addition of ethylene oxide was completed, the reaction was allowed to proceed at 90 to 100° C. for 2 hours. The reaction product was cooled to 80° C. and treated at a reduced pressure for 1 hour in the condition of 75 to 85° C. and 50 to 100 Torr while nitrogen gas was blown into the reactor.

The reaction product was transferred to a 5 liter eggplant type flask, quickly neutralized with a 1N hydrochloric acid and then dried and filtered in an atmosphere of nitrogen gas. The obtained reaction product was subjected to the measurement in accordance with GPC. The value of $S_1/S_0$ was obtained from the chromatogram and found to be 0.119.

Into a 5 liter four-necked flask equipped with a stirrer, a thermometer, an inlet for the air, a Dean and Stark tube and a Dimroth condenser, 1,477 g of the reaction product was placed and then 1,500 g of toluene, 38 g of p-toluenesulfonic acid monohydrate and 6 g of hydroquinone were added. The temperature was raised to 50° C. and the mixture was stirred at 50 to 60° C. for 30 minutes. Methacrylic acid in an amount of 60 g was then added and the reaction was allowed to proceed at 110 to 120° C. for 12 hours while the air was blown into the mixture via the inlet for the air using an air pump. After the reaction product was cooled to 60° C. and transferred to a separating funnel, a 5N aqueous solution of sodium hydroxide was added and the mixture was shaken well. The mixture was then left standing and the formed lower layer was removed. To the remaining upper layer, a 20% by weight aqueous solution of sodium chloride was added and the mixture was shaken well. The mixture was then left standing and the formed lower layer was removed. To the remaining upper layer, 0.1 g of p-methoxyphenol was added. Toluene was removed at a reduced pressure at 60° C. or lower and polyoxyethylene monomethyl ether methacrylate (k) was obtained.

Comparative Example 3

The same type of pressure-resistant reactor as that used in Example 1 was cleaned well with water and purged with dry nitrogen gas to remove water inside the reactor. Then, the reactor was dried at a reduced pressure of 50 to 100 Torr for 15 minutes while steam was supplied to the steam jacket. After the reactor was cooled to the room temperature, 2,004 g of the same dry acetonitrile as that used in Example 7, i.e., the commercially obtained acetonitrile containing 51 ppm of water, was placed in the reactor via the inlet tube of nitrogen gas. The pressure inside the reactor was raised to 0.05 MPa with dry nitrogen gas and the content of the reactor was stirred for 15 minutes. Acetonitrile was then carefully taken out and 1,997 g of acetonitrile was recovered. The content of water in the recovered acetonitrile was obtained in accordance with the Karl Fischer method and found to be 121 ppm. The content of water inside the reactor obtained in accordance with equation (B) was 28.7.

Figure 10:
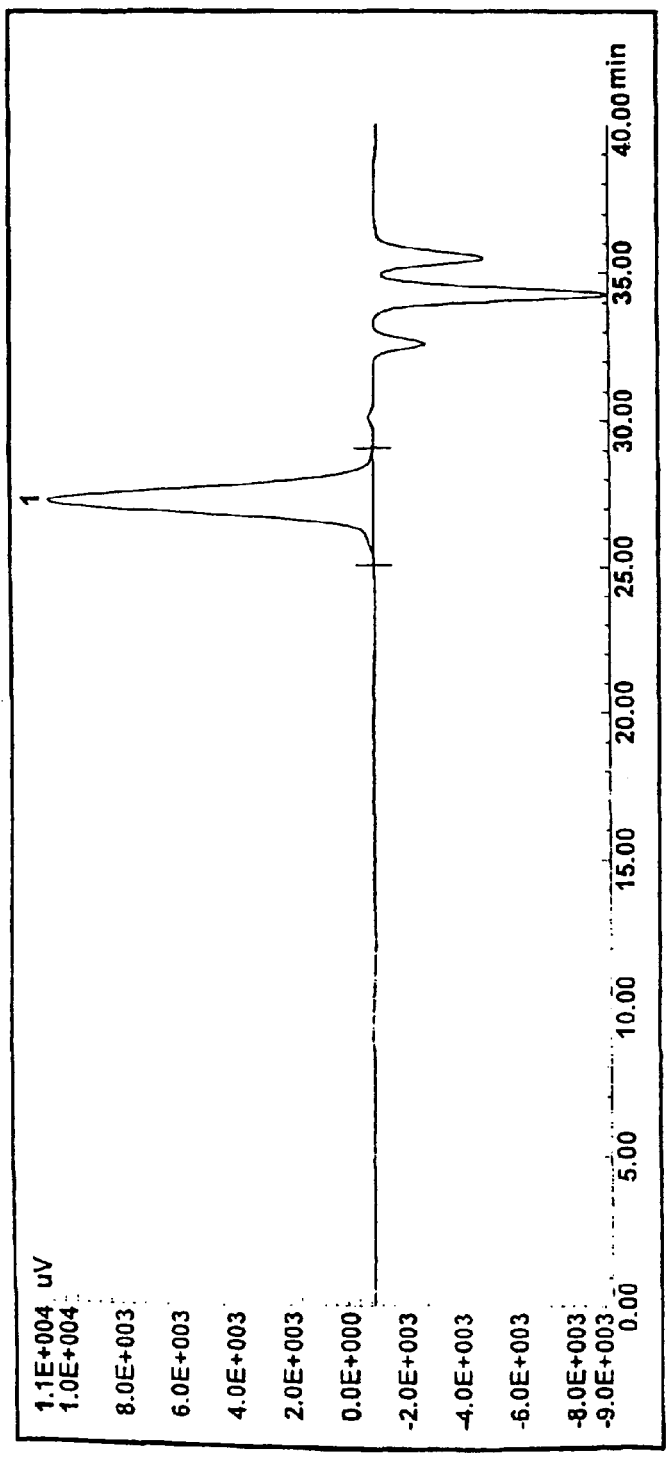
FIG. 10 shows a chromatogram of conventional polyoxyethylene monomethyl ether obtained in Comparative Example 3.

After the reactor was cooled to 30° C. or lower, 128 g of dry methanol and 27 g of sodium methoxide were placed and the reactor was purged with nitrogen gas. After the temperature was raised to 90° C, 3,640 g of ethylene oxide was continuously supplied with a pressure via the inlet tube for nitrogen gas in the condition of 90 to 100° C. and 0.6 MPa or lower while the content of the reactor was stirred. After the addition of ethylene oxide was completed, the reaction was allowed to proceed at 90 to 100° C. for 2 hours. The reaction product was cooled to 80° C. and treated at a reduced pressure for 1 hour in the condition of 75 to 85° C. and 50 to 100 Torr while nitrogen gas was blown into the reactor. The reaction product was transferred to a 5 liter eggplant type flask, quickly neutralized with a 1N hydrochloric acid and then dried and filtered in an atmosphere of nitrogen- gas. The obtained reaction product was subjected to the measurement in accordance with GPC. FIG. 10 shows the obtained chromatogram. The value of $S_1/S_0$ was obtained from the chromatogram and found to be 0.156.

Into a 5 liter four-necked flask equipped with a stirrer, a thermometer, an inlet for the air, a Dean and Stark tube and a Dimroth condenser, 1,650 g of the reaction product was placed and, then, 1,400 g of toluene, 115 g of p-toluenesulfonic acid monohydrate and 5 g of hydroquinone were added. The temperature was raised to 50° C. and the mixture was stirred at 50 to 60° C. for 30 minutes. Methacrylic acid in an amount of 206 g was then added and the reaction was allowed to proceed at 110 to 120° C. for 9 hours while the air was blown into the mixture via the inlet for the air using an air pump. After the reaction product was cooled to 60° C. and transferred to a separating funnel, a 5N aqueous solution of sodium hydroxide was added and the mixture was shaken well. The mixture was then left standing and the formed lower layer was removed. To the remaining upper layer, a 20% by weight aqueous solution of sodium chloride was added and the mixture was shaken well. The mixture was then left standing and the formed lower layer was removed. To the remaining upper layer, 0.1 g of p-methoxyphenol was added. Toluene was removed at a reduced pressure at 60° C. or lower and polyoxyethylene monomethyl ether methacrylate (g') was obtained.

Comparative Example 4

The same type of pressure-resistant reactor as that used in Example 1 was cleaned well with water and purged with dry nitrogen gas to remove water inside the reactor. Then, the reactor was dried at a reduced pressure of 50 to 100 Torr for 15 minutes while steam was supplied to the steam jacket. After the reactor was cooled to the room temperature, 46 g of a methanol solution of sodium methoxide (a product of KAWAKEN FINE CHEMICAL Co., Ltd.; SM-28; sodium methoxide: 28% by weight) was placed and the reactor was purged with nitrogen gas. After the temperature was raised to 90° C., 3,683 g of ethylene oxide was continuously supplied with a pressure via the inlet tube for nitrogen gas in the condition of 90 to 100° C. and 0.6 MPa or lower while the content of the reactor was stirred. After the addition of ethylene oxide was completed, the reaction was allowed to proceed at 90 to 100° C. for 2 hours. The reaction product was cooled to 80° C. and treated at a reduced pressure for 1 hour in the condition of 75 to 85° C. and 50 to 100 Torr while nitrogen gas was blown into the reactor.

Figure 11:
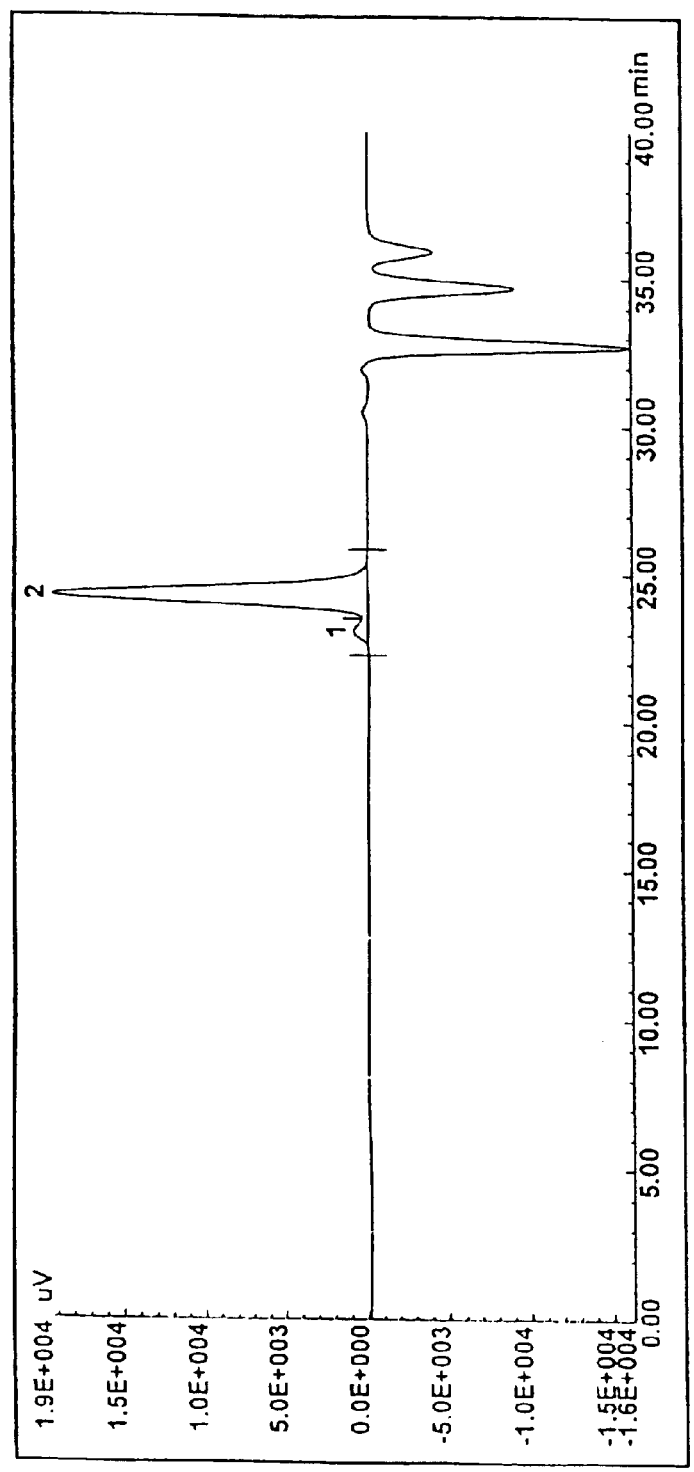
FIG. 11 shows a chromatogram of conventional polyoxyethylene monomethyl ether obtained in Comparative Example 4.

The reaction product was transferred to a 5 liter eggplant type flask, quickly neutralized with a 1N hydrochloric acid and then dried and filtered in an atmosphere of nitrogen gas. The obtained reaction product was subjected to the measurement in accordance with GPC. FIG. 11 shows the obtained chromatogram. The value of $S_1/S_0$ was obtained from the chromatogram and found to be 0.195.

Into a 5 liter four-necked flask equipped with a stirrer, a thermometer, an inlet for the air, a Dean and Stark tube and a Dimroth condenser, 1,477 g of the reaction product was placed and then 1,500 g of toluene, 38 g of p-toluenesulfonic acid monohydrate and 6 g of hydroquinone were added. The temperature was raised to 50° C. and the mixture was stirred at 50 to 60° C. for 30 minutes. Methacrylic acid in an amount of 60 g was then added and the reaction was allowed to proceed at 110 to 120° C. for 12 hours while the air was blown into the mixture via the inlet for the air using an air pump. After the reaction product was cooled to 60° C and transferred to a separating funnel, a 5N aqueous solution of sodium hydroxide was added and the mixture was shaken well. The mixture was then left standing and the formed lower layer was removed. To the remaining upper layer, a 20% by weight aqueous solution of sodium chloride was added and the mixture was shaken well. The mixture was then left standing and the formed lower layer was removed. To the remaining upper layer, 0.1 g of p-methoxyphenol was added. Toluene was removed at a reduced pressure at 60° C. or lower and polyoxyethylene monomethyl ether methacrylate (k') was obtained.

The values of L, $S_0$, $S_1$ and $S_1/S_0$ in the chromatograms obtained in Examples 7 to 11 and Comparative Examples 3 and 4 are shown in Table 3. The conditions of synthesis and the properties of the obtained compounds are shown in Table 4.

TABLE 3

|  | L (elution time) | L/3 (elution time) | $S_0$ | $S_1$ | $S_1/S_0$ |
|---|---|---|---|---|---|
| Example 7 | 0.0082 (27.358) | 0.0027 (26.808) | 45.4770 | 5.2003 | 0.1144 |
| Example 8 | 0.0065 (26.983) | 0.0022 (26.692) | 44.3610 | 5.1769 | 0.1167 |
| Example 9 | 0.0077 (25.792) | 0.0026 (25.192) | 48.7876 | 5.0300 | 0.1030 |
| Example 10 | 0.0100 (25.558) | 0.0033 (25.117) | 46.1342 | 5.7068 | 0.1237 |
| Example 11 | 0.0112 (24.783) | 0.0037 (24.388) | 44.6310 | 5.2977 | 0.1187 |
| Comparative Example 3 | 0.0081 (27.258) | 0.0027 (26.692) | 47.9631 | 7.4952 | 0.1562 |
| Comparative Example 4 | 0.0099 (24.567) | 0.0033 (24.117) | 46.3476 | 9.0365 | 0.1950 |

TABLE 4-1

|  | Example 7 | Example 8 | Example 9 | Example 10 |
|---|---|---|---|---|
| $R^1$ | methyl | stearyl | n-butyl | methyl |
| AO | EO | PO | PO-BO | EO/PO |
| Wi (g) | 2010 | 2100 | 1975 | 1857 |
| Ci (ppm) | 51 | 44 | 51 | 51 |
| Cf (ppm) | 66 | 59 | 65 | 68 |
| V (ml) | 4890 | 4890 | 4890 | 4890 |
| Content of water | 6.2 | 6.4 | 5.7 | 6.5 |
| Hydroxyl value (KOH mg/g) | 68.1 | 58.0 | 30.8 | 27.8 |
| Molecular weight | 824 | 967 | 1821 | 2018 |
| n | 18 | 12 | 25-4 | 32/10 |
| $S_1/S_0$ | 0.114 | 0.117 | 0.103 | 0.124 |
| $R^2$ | MA | MA | MA | A |
| Saponification value (KOH mg/g) | 61.7 | 56.5 | 31.3 | 28.2 |
| Bromine value (mg/100 g) | 17.6 | 14.8 | 8.0 | 7.4 |

TABLE 4-2

|  | Example 11 | Comparative Example 3 | Comparative Example 4 |
|---|---|---|---|
| $R^1$ | methyl | methyl | methyl |
| AO | EO | EO | EO |
| Wi (g) | 2206 | 2004 | 2210 |
| Ci (ppm) | 44 | 51 | 44 |
| Cf (ppm) | 63 | 121 | 112 |
| V (ml) | 4890 | 4890 | 4890 |
| Content of water | 8.6 | 28.7 | 45.8 |
| Hydroxyl value (KOH mg/g) | 19.0 | 68.0 | 19.1 |
| Molecular weight | 2953 | 825 | 2937 |
| n | 67 | 18 | 67 |
| $S_1/S_0$ | 0.119 | 0.156 | 0.195 |
| $R^2$ | MA | MA | MA |
| Saponification value (KOH mg/g) | 19.5 | 61.7 | 19.5 |
| Bromine value (mg/100 g) | 5.0 | 17.5 | 5.0 |

Notes:
EO: ethylene oxide
PO: propylene oxide
BO: 1,2-butylene oxide
PO-BO: block addition of PO and BO
EO/PO: random addition of EO and PO
MA: methacryloyl group
A: acryloyl group
Hydroxyl value: measured in accordance with the method of Japanese Industrial Standard K 1557 6.4
Saponification value: measured in accordance with the method of Japanese Industrial Standard K 0070
Bromine value: measured in accordance with the method of Japanese Industrial Standard K 2605
Molecular weight and n: calculated from the hydroxyl value assuming that the compound is a monoalkyl ether

Example 12

Into a 1 liter four-necked flask equipped with a stirrer, a thermometer, an inlet for nitrogen gas and a condenser, 500 g of polyoxyethylene monomethyl monoallyl ether (a) obtained in Example 1, 27 g of maleic anhydride and 200 ml of toluene were placed and the temperature was raised to 60° C. in an atmosphere of nitrogen gas. Then, 12 g of benzoyl peroxide was added and the reaction was allowed to proceed in an atmosphere of nitrogen gas at 70 to 75° C. for 8 hours. After the reaction was completed, toluene used as the solvent was removed at a reduced pressure at 90 to 100° C. and reddish brown copolymer (P-a) was obtained. The obtained copolymer had a kinematic viscosity of 251 cSt at 100° C. and a molecular weight of 20,900 as measured in accordance with GPC.

In the measurement of GPC, SHODEX GPC SYSTEM-11 was used as the system, SHODEX RI-71 was used as the differential refractometer and SHODEX KF801, KF-803 and KF-804 were connected in series and used as the column. The temperature of the column was set at 40° C. A 0.05 mol/liter aqueous solution of sodium nitrate was used as the developing solvent and supplied at a rate of 1 ml/minute. Into the column, 0.1 ml of a sample solution containing 0.1% by weight of the sample was injected. The molecular weight was a weight-average molecular weight which was obtained from a chromatogram obtained by using a BORWIN GPC computation program on the basis of the value of polyethylene glycol used as the reference.

The molecular weight was measured in the same condition in the following Examples and Comparative Examples except for Examples 15 and 16 and Comparative Example 17.

Example 13

Into the same type of four-necked flask as that used in Example 12, 390 g of polyoxyethylene monomethyl monoallyl ether (b) obtained in Example 2, 13 g of maleic anhydride, 4.4 g of sodium allylsulfonate and 400 g of water were placed and the temperature was raised to 30° C. to dissolve the materials in water. Ammonium persulfate in an amount of 9.6 g was then added and the reaction was allowed to proceed in an atmosphere of nitrogen gas at 60 to 70° C. for 18 hours and an aqueous solution of yellowish brown copolymer (P-b) was obtained. The obtained aqueous solution of the copolymer had a kinematic viscosity of 787 cSt at 25° C. The concentration of the copolymer in the aqueous solution was obtained from the decrease in the weight after drying at 120° C. for 2 hours and found to be 49.6% by weight. The molecular weight of the copolymer obtained after drying was measured in accordance with GPC and found to be 34,700.

Example 14

Into the same type of four-necked flask as that used in Example 12, 480 g of polyoxyethyleneoxypropylene monobutyl monoallyl ether (d) obtained in Example 4, 4 g of styrene, 23.5 g of maleic anhydride and 300 ml of xylene were placed and the temperature was raised to 45° C. in an atmosphere of nitrogen gas. Then, 1.6 g of 2,2'-azobisisobutyronitrile was added and the reaction was allowed to proceed in an atmosphere of nitrogen gas at 75 to 80° C. for 8 hours. After the reaction was completed, xylene used as the solvent was removed at a reduced pressure at 90 to 100° C. and light yellow copolymer (P-d) was obtained. The obtained copolymer had a kinematic viscosity of 205 cSt at 100° C. and a molecular weight of 23,900 as measured in accordance with GPC.

Comparative Example 5

The reaction was conducted in accordance with the same procedures as those conducted in Example 12 except that polyoxyethylene monomethyl monoallyl ether (a') obtained in Comparative Example 1 was used in place of polyoxyethylene monomethyl monoallyl ether (a) obtained in Example 1 and reddish brown copolymer (P-a') was obtained. The obtained copolymer (P-a') had a kinematic viscosity of 283 cSt at 100° C. and a molecular weight of 26,100 as measured in accordance with GPC.

Comparative Example 6

Into a 500 ml four-necked flask equipped with a stirrer, a thermometer, an inlet for nitrogen gas and a condenser, 126 g of polyoxyethylene monomethyl monoallyl ether (b') obtained in Comparative Example 2, 4.1 g of maleic anhydride, 1.4 g of sodium allylsulfonate and 129 g of water were placed and the temperature was raised to 30° C. to dissolve the materials in water. Then, 3.1 g of ammonium persulfate was added and the reaction was allowed to proceed in an atmosphere of nitrogen gas at 60 to 70° C. for 18 hours and an aqueous solution of yellowish brown copolymer (P-b') was obtained. The obtained aqueous solution of the copolymer had a kinematic viscosity of 985 cSt at 25° C. The concentration of the copolymer in the aqueous solution was obtained from the decrease in the weight after drying at 120° C. for 2 hours and found to be 49.1% by weight. The molecular weight of the copolymer obtained after drying was measured in accordance with GPC and found to be 41,600.

The compositions of the copolymers obtained in Examples 12 to 14 are shown in Table 5.

TABLE 5

| Copolymer | Compound of formula [2] type | Compound of formula [2] amount (mol) | Copolymerizable monomer type | Copolymerizable monomer amount (mol) |
|---|---|---|---|---|
| Example 12 | P-a | a | 0.25 | maleic anhydride | 0.28 |
| Example 13 | P-b | b | 0.07 | maleic acid<br>sodium allylsulfonate | 0.11<br>0.03 |
| Example 14 | P-d | d | 0.20 | styrene<br>maleic anhydride | 0.04<br>0.24 |
| Comparative Example 5 | P-a' | a' | 0.25 | maleic anhydride | 0.28 |
| Comparative Example 6 | P-b' | b' | 0.02 | maleic acid<br>sodium allylsulfonate | 0.03<br>0.01 |

Example 15

Into a 2 liter four-necked flask equipped with a stirrer, a thermometer, an inlet for nitrogen gas and a condenser, 223 g of polyoxyethylene monomethyl ether methacrylate (g) obtained in Example 7, 100 g of water, 300 g of 2-propanol, 10 g of thioglycolic acid and 2 g of potassium persulfate were placed and the polymerization was allowed to proceed in an atmosphere of nitrogen at a temperature of 70 to 75° C. for 6 hours. After the polymerization was completed, 2-propanol used as the solvent was removed at a reduced pressure and an aqueous solution of a polymer was obtained. The concentration of the copolymer in the aqueous solution was obtained from the decrease in the weight after drying at 120° C. for 2 hours and found to be 30.3% by weight. The obtained aqueous solution of the copolymer had a kinematic viscosity of 1,173 cSt at 40° C. and a molecular weight of 63,100 as measured in accordance with GPC.

Into a 200 ml Erlenmeyer flask having a fitted glass stopper, 15 g of the obtained solution was placed and 135 g of tetrahydrofuran was added. The mixture was shaken well and the obtained solution was transparent.

In the measurement of GPC, SHODEX GPC SYSTEM-11 was used as the system, SHODEX RI-71 was used as the differential refractometer and SHODEX KF804L was used as the column. The temperature of the column was set at 40° C. Tetrahydrofuran was used as the developing solvent and supplied at a rate of 1 ml/minute. Into the column, 0.1 ml of a sample solution containing 0.1% by weight of the sample was injected. The molecular weight was a weight-average molecular weight which was obtained from a chromatogram obtained by using a BORWIN GPC computation program on the basis of the value of polyethylene glycol used as the reference.

The molecular weight was measured in the same condition in Example 16 and Comparative Example 7 described in the following.

Example 16

Into the same type of apparatus as that used in Example 15, 189 g of polyoxypropyleneoxybutylene monobutyl ether methacrylate (i) obtained in Example 9, 500 g of 2-propanol, 4 g of a-methylstyrene dimer and 2 g of benzoyl peroxide were placed and the polymerization was allowed to proceed in an atmosphere of nitrogen at a temperature of 75 to 80° C. for 5 hours. After the polymerization was completed, the concentration of the copolymer in the aqueous solution was obtained from the decrease in the weight after drying at 120° C. for 2 hours and found to be 28.2% by weight. The obtained aqueous solution of the copolymer had a kinematic viscosity of 197 cSt at 40° C. and a molecular weight of 53,300 as measured in accordance with GPC.

Into a 200 ml Erlenmeyer flask having a fitted glass stopper, 15 g of the obtained solution was placed and 135 g of tetrahydrofuran was added. The mixture was shaken well and the obtained solution was transparent.

Comparative Example 7

The reaction was conducted in accordance with the same procedures as those conducted in Example 15 except that 223 g of polyoxyethylene monomethyl ether methacrylate (g') obtained in Comparative Example 3 was used in place of polyoxyethylene monomethyl ether methacrylate (g) obtained in Example 7. After the polymerization was completed, 2-propanol used as the solvent was removed at a reduced pressure and an aqueous solution of a polymer was obtained. The concentration of the copolymer in the aqueous solution was obtained from the decrease in the weight after drying at 120° C. for 2 hours and found to be 30.5% by weight. The obtained aqueous solution of the copolymer had a kinematic viscosity of 1,548 cSt at 40° C. and a molecular weight of 76,400 as measured in accordance with GPC.

Into a 200 ml Erlenmeyer flask having a fitted glass stopper, 15 g of the obtained solution was placed and 135 g of tetrahydrofuran was added. The mixture was shaken well and turbidity was found in the obtained solution. It is considered that an insoluble polymer formed by crosslinking was present.

Example 17

Into a 2 liter four-necked flask equipped with a stirrer, a condenser, an inlet for nitrogen gas, a thermometer and two dropping funnels, 54 g of maleic anhydride and 200 g of toluene were placed and the temperature was raised to 85° C. in an atmosphere of nitrogen gas. A solution prepared by mixing 480 g of polyoxyethylene monomethyl ether methacrylate (g) obtained in Example 7 and 200 g of toluene was placed in one dropping funnel and a solution prepared by dissolving 20 g of azobisisobutyronitrile into 100 g of toluene was placed in the other separate dropping funnel. Both solutions were added into the flask dropwise at 85 to 95° C. in an atmosphere of nitrogen gas over 2 hours. After the addition was completed, the reaction was allowed to proceed at a temperature in the same range for 1 hour. After the reaction was completed, toluene used as the solvent was removed at a reduced pressure at 90 to 100° C. and reddish brown polymer (P-g) was obtained. The obtained polymer had a kinematic viscosity of 206 cSt at 100° C. and a molecular weight of 19,700 as obtained in accordance with GPC.

Example 18

Into a 3 liter four-necked flask equipped with a stirrer, a condenser, an inlet for nitrogen gas, a thermometer and two dropping funnels, 200 g of ion-exchanged water and 100 g of 2-propanol were placed and the temperature was raised to 80° C. A solution prepared by mixing 414 g of polyoxyethyleneoxypropylene monomethyl ether acrylate (j) obtained in Example 10, 29 g of acrylic acid, 200 g of ion-exchanged water and 100 g of 2-propanol was placed in one dropping funnel and 20 g of a 10% by weight aqueous solution of ammonium persulfate was placed in the other dropping funnel. Both solutions were added into the flask dropwise at 80 to 90° C. in an atmosphere of nitrogen gas over 3 hours. After the addition was completed, the reaction was allowed to proceed at a temperature in the same range for 1 hour. After the reaction was completed, 2-propanol used as the solvent was removed at a reduced pressure and the remaining product was neutralized by adding a 5N aqueous solution of sodium hydroxide. After adjusting the content of water by adding ion-exchanged water, an aqueous solution of copolymer (P-j) was obtained. The concentration of the copolymer in the aqueous solution was obtained from the decrease in the weight after drying at 120° C. for 2 hours and found to be 59.6% by weight. The obtained aqueous solution of the copolymer had a kinematic viscosity of 172 cSt at 25° C. and a molecular weight of 30,300 as obtained in accordance with GPC.

Example 19

Into a 2 liter four-necked flask equipped with a stirrer, a condenser, an inlet for nitrogen gas, a thermometer and two dropping funnels, 200 g of ion-exchanged water was placed and the temperature was raised to 80° C. in an atmosphere of nitrogen gas. A solution prepared by dissolving 604 g of polyoxyethylene monomethyl ether methacrylate (k) obtained in Example 11 and 39 g of methacrylic add in 400 g of ion-exchanged water was placed in one dropping funnel and a solution prepared by dissolving 3 g of ammonium persulfate and 2 g of sodium methallylsulfonate in 40 g of ion-exchanged water was placed in the other dropping funnel. Both solutions were added into the flask dropwise at 80 to 85° C. in an atmosphere of nitrogen gas over 2 hours. After the addition was completed, the reaction was allowed to proceed at a temperature in the same range for 1 hour. After the reaction was completed, the product was neutralized by adding a 5N aqueous solution of sodium hydroxide. After adjusting the content of water by adding ion-exchanged water, an aqueous solution of copolymer (P-k) was obtained. The concentration of the copolymer in the aqueous solution was obtained from the decrease in the weight after drying at 120° C. for 2 hours and found to be 59.2% by weight. The obtained aqueous solution of the copolymer had a kinematic viscosity of 397 cSt at 25° C. and a molecular weight of 36,200 as obtained in accordance with GPC.

Comparative Example 8

The reaction was conducted in accordance with the same procedures as those conducted in Example 17 except that polyoxylethylene monomethyl ether methacrylate (g') obtained in Comparative Example 3 was used in place of polyoxyethylene monomethyl ether methacrylate (g) obtained in Example 7 and reddish brown copolymer (P-g') was obtained. The obtained copolymer (P-g') had a Cinematic viscosity of 243 cSt at 100° C. and a molecular weight of 22,100 as measured in accordance with GPC.

Comparative Example 9

The reaction was conducted in accordance with the same procedures as those conducted in Example 19 except that polyoxylethylene monomethyl ether methacrylate (k') obtained in Comparative Example 4 was used in place of polyoxyethylene monomethyl ether methacrylate (k) obtained in Example 11 and an aqueous solution of copolymer (P-k') was obtained. The concentration of the copolymer in the aqueous solution was obtained from the decrease in the weight after drying at 120° C. for 2 hours and found to be 59.4% by weight. The obtained aqueous solution of the copolymer had a kinematic viscosity of 448 cSt at 25° C. and a molecular weight of 42,800 as measured in accordance with GPC.

The compositions of the copolymers obtained in Examples 17 to 19 and Comparative Examples 8 and 9 are shown in Table 6.

TABLE 6

| | Copolymer | Compound of formula [2] | | Copolymerizable monomer | |
|---|---|---|---|---|---|
| | | type | amount (mol) | type | amount (mol) |
| Example 17 | P-g | g | 0.54 | maleic anhydride | 0.55 |
| Example 18 | P-j | j | 0.20 | acrylic acid | 0.40 |
| Example 19 | P-k | k | 0.20 | methacrylic acid | 0.45 |
| | | | | sodium methallyl-sulfonate | 0.01 |
| Comparative Example 8 | P-g' | g' | 0.54 | maleic anhydride | 0.55 |
| Comparative Example 9 | P-k' | k' | 0.20 | methacrylic acid | 0.45 |
| | | | | sodium methallyl-sulfonate | 0.01 |

Example 20

Evaluation as a Dispersant in a Toluene System

Into a 300 ml beaker, 70 g of talc (manufactured by KANTO KAGAKU Co., Ltd.; 40000-02) and 90 g of toluene were placed Copolymer (P-a) obtained in Example 12 in an amount of 0.14 g was added as the dispersant and the mixture was mixed by a stirrer having blades for 3 minutes.

The slurry composition prepared above was packed into a cylindrical pipe which had an inner diameter of 50 mm, an outer diameter of 60 mm and a height of 40 mm, was made of polyvinyl chloride and was placed on a glass plate. The upper face of the packed composition was made flat using a paste knife and then the cylindrical pipe was quietly removed in the upward direction, leaving the composition on the glass plate. When the slurry composition stopped flowing, portions of the maximum diameter and the minimum diameter of the deformed composition were visually observed and the maximum diameter and the minimum diameter were measured to the unit of millimeter. The average of the maximum diameter and the minimum diameter was obtained and the result was expressed as an absolute number, the lowest digit corresponding to the unit of millimeter. This value was used as the flow value of the slurry composition. The flow value of the composition prepared above was 155.

Example 21

A slurry composition was prepared in accordance with the same procedures as those conducted in Example 20 except that copolymer (P-d) obtained in Example 14 was used in place of copolymer (P-a). The flow value of the composition was obtained and found to be 162.

Comparative Example 10

A slurry composition was prepared in accordance with the same procedures as those conducted in Example 20 except that no dispersants were added. The flow value of the composition was obtained and found to be 83.

Comparative Example 11

A slurry composition was prepared in accordance with the same procedures as those conducted in Example 20 except that copolymer (P-a') obtained in Comparative Example 5 was used in place of copolymer (P-a). The flow value of the composition was obtained and found to be 126.

The results obtained in Examples 20 and 21 and Comparative Examples 10 and 11 are shown in Table 7.

TABLE 7

|  | Copolymer | | |
| --- | --- | --- | --- |
|  | type | amount (% by weight per talc) | Flow value |
| Example 20 | P-a | 0.2 | 155 |
| Example 21 | P-d | 0.2 | 162 |
| Comparative Example 10 | — | — | 83 |
| Comparative Example 11 | P-a' | 0.2 | 126 |

It is shown in the results in Table 7 that the slurry compositions obtained in Examples 20 and 21 in which the copolymers of the polymerizable polyoxyalkylene monoalkyl ether derivative of the present invention were added had larger flow values and showed superior dispersion of talc. In contrast, the slurry composition obtained in Comparative Example 10 in which no dispersants were added and the slurry composition obtained in Comparative Example 11 in which the copolymer obtained in Comparative Example 5 was added had smaller flow values and showed inferior dispersion of talc.

Example 22

Evaluation as a Dispersant in a Ethylene Glycol Monobutyl Ether System

Into a 300 ml beaker, 50 g of titanium oxide (manufactured by KANTO KAGAKU Co., Ltd.) and 90 g of ethylene glycol monobutyl ether were placed. A 40% by weight aqueous solution of copolymer (P-g) obtained in Example 17 in an amount of 0.5 g was added as the dispersant and the mixture was mixed by a stirrer having blades for 3 minutes to prepare a slurry composition.

The slurry composition prepared above was packed into a cylindrical pipe which had an inner diameter of 50 mm, an outer diameter of 60 mm and a height of 40 mm, was made of polyvinyl chloride and was placed on a glass plate. The upper face of the packed composition was made flat using a paste knife and then the cylindrical pipe was quietly removed in the upward direction, leaving the composition on the glass plate. When the slurry composition stopped flowing, portions of the maximum diameter and the minimum diameter of the deformed composition were visually observed and the maximum diameter and the minimum diameter were measured to the unit of millimeter. The average of the maximum diameter and the minimum diameter was obtained and the result was expressed as an absolute number, the lowest digit corresponding to the unit of millimeter. This value was used as the flow value of the slurry composition. The flow value of the composition prepared above was 141.

Example 23

A slurry composition was prepared in accordance with the same procedures as those conducted in Example 22 except that 0.5 g of an aqueous solution of copolymer (P-j) obtained in Example 18 was used in place of 0.5 g of the 40% by weight aqueous solution of copolymer (P-g). The flow value of the composition was obtained and found to be 137.

Comparative Example 12

A slurry composition was prepared in accordance with the same procedures as those conducted in Example 22 except that no dispersants were added. The flow value of the composition was obtained and found to be 77.

Comparative Example 13

A slurry composition was prepared in accordance with the same procedures as those conducted in Example 22 except that a 40% by weight aqueous solution of copolymer (P-g') obtained in Comparative Example 8 was used in place of the 40% by weight aqueous solution of copolymer (P-g). The flow value of the composition was obtained and found to be 118.

The results obtained in Examples 22 and 23 and Comparative Examples 12 and 13 are shown in Table 8.

TABLE 8

|  | Copolymer | | |
| --- | --- | --- | --- |
|  | type | amount (% by weight per titanium oxide) | Flow value |
| Example 22 | P-g | 0.4 | 141 |
| Example 23 | P-j | 0.4 | 137 |
| Comparative Example 12 | — | — | 77 |
| Comparative Example 13 | P-g' | 0.4 | 118 |

It is shown in the results in Table 8 that the slurry compositions obtained in Examples 22 and 23 in which the copolymers of the polymerizable polyoxyalkylene monoalkyl ether derivatives of the present invention were added had larger flow values and showed superior dispersion of titanium oxide. In contrast, the slurry composition obtained in Comparative Example 12 in which no dispersants were added and the slurry composition obtained in Comparative Example 13 in which the copolymer obtained in Comparative Example 8 was added had smaller flow values and showed inferior dispersion of titanium oxide.

Example 24

Into a mixing bowl for mechanical mixing specified in Japanese Industrial Standard R 5201, 600 g of an ordinary Portland cement and 1,025 g of sand (produced at KIMITSU, CHIBA-KEN; surface dried specific gravity under saturated surface-dry: 2.51; surface moisture ratio: 0.2% by weight) were placed and mixed together at a low rotation speed for 30 seconds. Then, 225 g of an aqueous solution prepared by adding water to 2.4 g of copolymer (P-a) obtained in Example 12 and 0.1 g of a defoaming agent (manufactured by NIPPON OIL AND FAT Co., Ltd.; DISFOAM CC-118) was added in 15 seconds. The mixture was mixed together at a low rotation speed for 15 seconds and then at a high rotation speed for 2 minutes to prepare a mortar.

The flow value of the mortar prepared above was measured in accordance with the method of flow test described in Japanese Industrial Standard R 5201 and found to be 251. After the measurement of the flow value, the mortar was kept in a sealed container and the same measurement was conducted using this mortar 30 minutes and 60 minutes after the preparation. The flow value 30 minutes after the preparation was 234 and the flow value 60 minutes after the preparation was 182.

Example 25

In accordance with the same procedures as those conducted in Example 24 except that 4.76 g of the aqueous solution of copolymer (P-b) obtained in Example 13 was used in place of 2.4 g of copolymer (P-a), a mortar was prepared and the flow value of the prepared mortar was measured.

The flow value of the mortar was as follows: immediately after the preparation: 268; 30 minutes after the preparation: 265; and 60 minutes after the preparation: 210.

Comparative Example 14

In accordance with the same procedures as those conducted in Example 24 except that copolymer (P-a') obtained in Comparative Example 5 was used in place of copolymer (P-a), a mortar was prepared and the flow value of the prepared mortar was measured.

The flow value of the mortar was as follows: immediately after the preparation: 154; 30 minutes after the preparation: 117; and 60 minutes after the preparation: 110.

Comparative Example 15

In accordance with the same procedures as those conducted in Example 24 except that 4.72 g of the aqueous solution of copolymer (P-b') obtained in Comparative Example 6 was used in place of 2.4 g of copolymer (P-a), a mortar was prepared and the flow value of the prepared mortar was measured.

The flow value of the mortar was as follows: immediately after the preparation: 196; 30 minutes after the preparation: 183; and 60 minutes after the preparation: 143.

Example 26

In accordance with the same procedures as those conducted in Example 24 except that copolymer (P-g) obtained in Example 17 was used in place of copolymer (P-a), a mortar was prepared and the flow value of the prepared mortar was measured.

The flow value of the mortar was as follows: immediately after the preparation: 240; 30 minutes after the preparation: 221; and 60 minutes after the preparation: 177.

Example 27

In accordance with the same procedures as those conducted in Example 24 except that 6.0 g of the aqueous solution of copolymer (P-k) obtained in Example 19 was used in place of 2.4 g of copolymer (P-a), a mortar was prepared and the flow value of the prepared mortar was measured.

The flow value of the mortar was as follows: immediately after the preparation: 229; 30 minutes after the preparation: 213; and 60 minutes after the preparation: 188.

Comparative Example 16

In accordance with the same procedures as those conducted in Example 24 except that copolymer (P-g') obtained in Comparative Example 8 was used in place of copolymer (P-a), a mortar was prepared and the flow value of the prepared mortar was measured.

The flow value of the mortar was as follows: immediately after the preparation: 196; 30 minutes after the preparation: 149; and 60 minutes after the preparation: 130.

Comparative Example 17

In accordance with the same procedures as those conducted in Example 24 except that 6.0 g of the aqueous solution of copolymer (P-k') obtained in Comparative Example 9 was used in place of 2.4 g of copolymer (P-a), a mortar was prepared and the flow value of the prepared mortar was measured.

The flow value of the mortar was as follows: immediately after the preparation: 141; 30 minutes after the preparation: 123; and 60 minutes after the preparation: 104.

The results obtained in Examples 24 to 27 and Comparative Examples 14 to 17 are shown in Table 9.

TABLE 9

| | Copolymer | | Flow value | | |
|---|---|---|---|---|---|
| | type | amount (% by weight per cement) | immediately after preparation | 30 min. after preparation | 60 min. after preparation |
| Example 24 | P-a | 0.4 | 251 | 234 | 182 |
| Example 25 | P-b | 0.4* | 268 | 265 | 210 |
| Comparative Example 14 | P-a' | 0.4 | 154 | 117 | 110 |
| Comparative Example 15 | P-b' | 0.4* | 196 | 183 | 143 |
| Example 26 | P-g | 0.4 | 240 | 221 | 177 |
| Example 27 | P-k | 0.4* | 229 | 213 | 188 |
| Comparative Example 16 | P-g' | 0.4 | 196 | 149 | 130 |
| Comparative Example 17 | P-k' | 0.4* | 141 | 123 | 104 |

*The amount of the solid component

It is shown in the results in Table 9 that the mortars obtained in Examples 24 to 27 in which the dispersants containing the copolymers of the polymerizable polyoxyalkylene monoalkyl ether derivatives of the present invention were added had larger flow values immediately after the preparation, 30 minutes after the preparation and 60 minutes after the preparation and showed superior dispersing properties. In contrast, the mortars obtained in Comparative Examples 14 to 17 in which the dispersants containing the copolymers obtained in Comparative Examples 5 to 9 were added had smaller flow values and showed inferior dispersing properties.

What is claimed is:

1. A homopolymer which is obtained by polymerization of a polymerizable polyoxyalkylene monoalkyl ether derivative represented by formula [3]

$$R^1O(AO)_nR^3 \qquad [3]$$

wherein $R^1$ represents a hydrocarbon group having 1 to 18 carbon atoms. $R^3$ represents acryloyl group or methacryloyl group, AO represents an oxyalkylene group having 2 to 4 carbon atoms, n represents an average number of addition of the oxyalkylene group which is 5 to 500, a plurality of AO may represent the same type of oxyalkylene group or different types of oxyalkylene groups and, when the plurality of AO represent different types of oxyalkylene groups, the different types of oxyalkylene groups may be arranged randomly or in blocks, and has a molecular weight of 1,000 to 300,000, said polyoxyalkylene monoalkyl ether derivative being obtained by using a polyoxyalkylene monoalkyl ether represented by formula [1]:

$$R^1O(AO)_nH \quad [1]$$

wherein $R^1$ and AO and n are as defined above, wherein a chromatogram of the polyoxyalkylene monoalkyl ether obtained in accordance with gel permeation chromatography which exhibits a relation between an intensity of a refractive index obtained by a differential refractometer and an elution time satisfies a relation expressed by equation (A):

$$S_1/S_0 \leq 0.15 \quad (A)$$

wherein $S_1$ represents an area under a portion of the chromatogram from start of elution to an earliest elution time when the intensity of a refractive index has a value of L/3, L representing a shortest distance between a greatest maximum point of the intensity of a refractive index and a base line, and $S_0$ represents an area under a portion of the chromatogram from start of elution time when the intensity of a refractive index has the greatest maximum value.

2. A copolymer which is obtained by copolymerization of:

5 to 95% by mol of a polymerizable polyoxyalkylene monoalkyl ether derivative represented by formula [2]

$$R^1O(AO)_nR^2 \quad [2]$$

wherein $R^1$ represents a hydrocarbon group having 1 to 18 carbon atoms, $R^2$ represents an unsaturated hydrocarbon group having 2 to 4 carbon atoms, AO represents an oxyalkylene group having 2 to 4 carbon atoms, n represents an average number of addition of the oxyalkylene group which is 5 to 500, a plurality of AO may represent the same type of oxyalkylene group or different types of oxyalkylene groups and, when the plurality of AO represent different types of oxyalkylene groups, the different types of oxyalkylene groups may be arranged randomly or in blocks, and 95 to 5% by mol of a monomer copolymerizable with the polymerizable polyoxyalkylene monoalkyl ether derivative, said copolymer having a molecular weight of 500 to 100,000, said polyoxyalkylene monoalkyl ether derivative being obtained by using a polyoxyalkylene monoalkyl ether represented by formula [1]:

$$R^1O(AO)_nH \quad [1]$$

wherein $R^1$ and AO and n are as defined above, wherein a chromatogram of the polyoxyalkylene monoalkyl ether obtained in accordance with gel permeation chromatography which exhibits a relation between an intensity of a refractive index obtained by a differential refractometer and an elution time satisfies a relation expressed by equation (A):

$$S_1/S_0 \leq 0.15 \quad (A)$$

wherein $S_1$ represents an area under a portion of the chromatogram from start of elution to an earliest elution time when the intensity of a refractive index has a value of L/3, L representing a shortest distance between a greatest maximum point of the intensity of a refractive index and a base line, and $S_0$ represents an area under a portion of the chromatogram from start of elution time when the intensity of a refractive index has the greatest maximum value.

3. A copolymer according to claim 2, wherein $R^2$ in formula [2] representing the polymerizable polyoxyalkylene monoalkyl ether derivative represents an unsaturated hydrocarbon group having 3 to 4 carbon atoms and the monomer copolymerizable with the polymerizable polyoxyalkylene monoalkyl ether derivative is an unsaturated carboxylic acid.

4. A copolymer which is obtained by copolymerization of:

5 to 95% by mol of a polymerizable polyoxyalkylene monoalkyl ether derivative represented by formula [3]

$$R^1O(AO)_nR^3 \quad [3]$$

wherein $R^1$ represents a hydrocarbon group having 1 to 18 carbon atoms, $R^3$ represents acryloyl group or methacryloyl group, AO represents an oxyalkylene group having 2 to 4 carbon atoms, n represents an average number of addition of the oxyalkylene group which is 5 to 500, a plurality of AO may represent the same type of oxyalkylene group or different types of oxyalkylene groups and, when the plurality of AO represent different types of oxyalkylene groups, the different types of oxyalkylene groups may be arranged randomly or in blocks, and 95 to 5% by mol of a monomer copolymerizable with the polymerizable polyoxyalkylene monoalkyl ether derivative, said copolymer having a molecular weight of 500 to 100,000, said polyoxyalkylene monoalkyl ether derivative being obtained by using a polyoxyalkylene monoalkyl ether represented by formula [1]:

$$R^1O(AO)_nH \quad [1]$$

wherein $R^1$, AO and n are defined above, wherein a chromatogram of the polyoxyalkylene monoalkyl ether obtained in accordance with gel permeation chromatography which exhibits a relation between an intensity of a refractive index obtained by a differential refractometer and an elution time satisfies a relation expressed by equation (A):

$$S_1/S_0 \leq 0.15 \quad (A)$$

wherein $S_1$ represents an area under a portion of the chromatogram from start of elution to an earliest elution time when the intensity of a refractive index has a value of L/3, L representing a shortest distance between a greatest maximum point of the intensity of a refractive index and a base line, and $S_0$ represents an area under a portion of the chromatogram from start of elution time when the intensity of a refractive index has the greatest maximum value.

5. A copolymer according to claim 4, wherein the monomer copolymerizable with the polymerizable polyoxyalkylene monoalkyl ether derivative represented by formula [3] is an unsaturated carboxylic acid.

6. A dispersant comprising a copolymer described in claim 2.

7. A dispersant comprising a copolymer described in claim 3.

8. A dispersant comprising a copolymer described in claim 4.

9. A dispersant comprising as copolymer described in claim 5.

10. A copolymer according to claim 3, wherein the unsaturated carboxylic acid is at least one acid selected from the group consisting of acrylic acid, methacrylic acid, maleic acid and maleic anhyride.

11. A copolymer according to claim 5, wherein the unsaturated carboxylic acid is at least one acid selected from the group consisting of acrylic acid, methacrylic acid, maleic acid and maleic anhyride.

* * * * *